US008128746B2

(12) United States Patent
Nakamura et al.

(10) Patent No.: US 8,128,746 B2
(45) Date of Patent: *Mar. 6, 2012

(54) INK COMPOSITION, INK JET RECORDING METHOD, METHOD FOR PRODUCING PLANOGRAPHIC PRINTING PLATE, AND PLANOGRAPHIC PRINTING PLATE

(75) Inventors: Ippei Nakamura, Kanagawa (JP); Yuuichi Hayata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 11/898,556

(22) Filed: Sep. 13, 2007

(65) Prior Publication Data

US 2008/0108747 A1 May 8, 2008

(30) Foreign Application Priority Data

Sep. 14, 2006 (JP) ................................ 2006-249549
Sep. 11, 2007 (JP) ................................ 2007-235332

(51) Int. Cl.
C09D 11/00 (2006.01)
C08F 26/08 (2006.01)
C08F 26/10 (2006.01)
C08F 20/40 (2006.01)
C08F 20/68 (2006.01)
C08F 120/40 (2006.01)
C08F 120/68 (2006.01)
C08F 220/40 (2006.01)
C08F 220/68 (2006.01)

(52) U.S. Cl. .................. 106/31.46; 106/31.76; 526/264; 526/327

(58) Field of Classification Search .................. 523/160, 523/161; 252/301.16; 106/20, 21, 31.65, 106/31.58, 31.69, 31.76, 31.86, 31.46; 526/264, 526/327
See application file for complete search history.

(56) References Cited

U.S. PATENT DOCUMENTS

| | | | | |
|---|---|---|---|---|
| 3,637,559 A * | 1/1972 | Pinkney et al. | ................ | 524/350 |
| 4,476,270 A * | 10/1984 | Brasen et al. | ................ | 524/364 |
| 5,173,113 A * | 12/1992 | Sugerman et al. | ......... | 106/31.35 |
| 5,939,469 A * | 8/1999 | Fussnegger et al. | ......... | 523/161 |
| 5,968,605 A * | 10/1999 | Lutz | ................ | 427/500 |
| 6,174,948 B1 * | 1/2001 | Thames et al. | ................ | 524/398 |
| 6,217,510 B1 | 4/2001 | Ozawa et al. | | |
| 6,235,916 B1 * | 5/2001 | Thames et al. | ................ | 554/219 |
| 6,310,115 B1 * | 10/2001 | Vanmaele et al. | ............. | 522/25 |
| 6,350,523 B1 * | 2/2002 | Schwalm | ................ | 428/423.1 |
| 6,554,419 B2 * | 4/2003 | Missell et al. | ................ | 347/105 |
| 6,599,972 B2 * | 7/2003 | Thames et al. | ................ | 524/398 |
| 6,624,223 B1 * | 9/2003 | Thames et al. | ................ | 524/398 |
| 6,680,355 B1 * | 1/2004 | Weingart et al. | ............. | 524/589 |
| 6,805,817 B2 * | 10/2004 | Zhang et al. | ................ | 252/589 |
| 6,887,946 B2 * | 5/2005 | Fukada et al. | ................ | 525/437 |
| 6,897,255 B1 * | 5/2005 | Thames et al. | ................ | 524/398 |
| 7,297,460 B2 * | 11/2007 | Vanmaele et al. | ......... | 430/270.1 |
| 7,365,105 B2 * | 4/2008 | Kiefer-Liptak | ............... | 522/121 |
| 7,553,605 B2 | 6/2009 | Hayata et al. | | |
| RE40,847 E * | 7/2009 | Vanmaele et al. | ............. | 427/466 |
| 2001/0021739 A1 * | 9/2001 | Thames et al. | ................ | 524/400 |
| 2002/0107303 A1 | 8/2002 | Miyabashi et al. | | |
| 2003/0045598 A1 | 3/2003 | Chen et al. | | |
| 2003/0055178 A1 * | 3/2003 | Gore et al. | ................ | 525/242 |
| 2003/0199612 A1 * | 10/2003 | Nakajima | ................ | 523/160 |
| 2004/0068029 A1 * | 4/2004 | Wang et al. | ................ | 523/160 |
| 2004/0168609 A1 * | 9/2004 | Freyberg et al. | ............. | 106/31.58 |
| 2004/0242735 A1 | 12/2004 | McMan et al. | | |
| 2004/0244622 A1 | 12/2004 | Ichinose et al. | | |
| 2005/0004259 A1 * | 1/2005 | Freyberg et al. | ............. | 523/160 |
| 2005/0058934 A1 * | 3/2005 | Kawauchi et al. | ......... | 430/270.1 |
| 2005/0142485 A1 * | 6/2005 | Nakamura et al. | ......... | 430/270.1 |
| 2005/0146544 A1 * | 7/2005 | Kondo | ................ | 347/7 |
| 2005/0208234 A1 * | 9/2005 | Hubertus et al. | ............. | 428/32.34 |
| 2006/0142415 A1 * | 6/2006 | Ylitalo et al. | ................ | 523/160 |
| 2007/0031758 A1 | 2/2007 | Nishikawa et al. | | |
| 2007/0042162 A1 * | 2/2007 | Selman et al. | ............. | 428/195.1 |
| 2007/0146430 A1 * | 6/2007 | Nakamura et al. | ............. | 347/52 |
| 2007/0211111 A1 * | 9/2007 | Hayata | ............. | 347/52 |
| 2008/0008966 A1 * | 1/2008 | Hayata et al. | ................ | 430/302 |
| 2008/0063981 A1 * | 3/2008 | Ohnishi | ................ | 430/302 |
| 2008/0108747 A1 * | 5/2008 | Nakamura et al. | ............. | 524/606 |
| 2009/0047603 A1 * | 2/2009 | Williamson | ................ | 430/302 |
| 2009/0082488 A1 * | 3/2009 | Takeda et al. | ................ | 522/182 |
| 2009/0234041 A1 * | 9/2009 | Belelie et al. | ................ | 522/182 |

FOREIGN PATENT DOCUMENTS

| | | |
|---|---|---|
| DE | 38 19 414 C1 | 2/1989 |
| EP | 0 003 789 A | 9/1979 |
| EP | 0 555 069 A1 | 8/1993 |
| EP | 1 057 843 A1 | 12/2000 |
| EP | 1 433 822 A1 | 6/2004 |
| EP | 1 528 088 A1 | 5/2005 |
| EP | 1 621 594 A1 | 2/2006 |
| EP | 1 739 141 A1 | 1/2007 |
| JP | 54-117203 A | 9/1979 |
| JP | 61057611 A * | 3/1986 |

(Continued)

OTHER PUBLICATIONS

Machine translation of JP 2006299117 2010.*
Congis, Photomer Products for UV/EB curing, 2003.*
Translation of JP 61057611 A, 2011.*
DATABASE WPI Week 200634; Derwent Publications Ltd.; May 4, 2006; London, GB; XP002455609.
DATABASE WPI Week 200370; Derwent Publications Ltd.; Aug. 14, 2003; London, GB; XP002455597.

(Continued)

Primary Examiner — Liam Heincer
(74) Attorney, Agent, or Firm — Sughrue Mion, PLLC

(57) ABSTRACT

The invention provides an ink composition comprising a polymerization initiator, a (meth)acrylate having a double bond with a carbon atom having an $sp^3$ hybrid orbital at an α position, and a colorant; an ink jet recording method using the ink composition; a planographic printing plate obtained by using the ink composition; and a method for producing the planographic printing plate.

16 Claims, No Drawings

FOREIGN PATENT DOCUMENTS

| | | | |
|---|---|---|---|
| JP | 02-53701 | U | 4/1990 |
| JP | 03-165731 | A | 7/1991 |
| JP | 05-202331 | A | 8/1993 |
| JP | 5-214280 | A | 8/1993 |
| JP | 06-154155 | A | 6/1994 |
| JP | 8-41133 | A | 2/1996 |
| JP | 09-038024 | A | 2/1997 |
| JP | 2880845 | B2 | 1/1999 |
| JP | 11-104070 | A | 4/1999 |
| JP | 2001-525479 | A | 12/2001 |
| JP | 2003-145573 | A | 5/2003 |
| JP | 2003-210388 | A | 7/2003 |
| JP | 2004-514014 | A | 5/2004 |
| JP | 2006299117 | A * | 11/2006 |
| WO | 99/29787 | A2 | 6/1999 |
| WO | 00/09332 | A1 | 2/2000 |
| WO | 02/38688 | A2 | 5/2002 |
| WO | 03/040242 | A2 | 5/2003 |
| WO | 03/104182 | A1 | 12/2003 |
| WO | 2004/007578 | A1 | 1/2004 |
| WO | 2006/085992 | A2 | 8/2006 |

OTHER PUBLICATIONS

N.S. Allan et al., "Chemistry & Technology of UV & EB Formulations for Coatings, Inks & Paints", vol. 2, 1991 Selective Industrial Training Associates Limited London, United Kingdom, pp. 239-307.

Partial European Search Report corresponding to European Application No. 07013001.8-2102, dated Sep. 6, 2007.

European Search Report corresponding to Application No. 07013001.8-2102, dated Nov. 5, 2007.

* cited by examiner

INK COMPOSITION, INK JET RECORDING METHOD, METHOD FOR PRODUCING PLANOGRAPHIC PRINTING PLATE, AND PLANOGRAPHIC PRINTING PLATE

CROSS-REFERENCE TO RELATED APPLICATION

This application claims priority under 35 USC 119 from Japanese Patent Applications Nos. 2006-249549 and 2007-235332, the disclosure of which is incorporated by reference herein.

BACKGROUND OF THE INVENTION

1. Field of the Invention

The invention relates to an ink composition that is preferably used for ink jet recording, an ink jet recording method, a planographic printing plate obtained by using the ink composition, and a method for producing a planographic printing plate.

2. Description of the Related Art

Various methods are known for forming an image on a recording medium such as paper based on an image data signal, for example, an electrophotographic method, a sublimation-type thermal transfer method, a melt-type thermal transfer method, and an ink jet recording method. The electrophotographic method requires a process of forming an electrostatic latent image on a photoreceptor drum by charging and light exposure, and a system therefore becomes complicated, resulting in increased production cost. The thermal transfer method can be conducted by an inexpensive apparatus, but requires use of ink ribbons, leading to increased running cost and generation of waste.

The ink jet recording method can also be conducted by an inexpensive apparatus. Moreover, an image is directly formed by ejecting ink only to regions of a support which are to be image regions, and the ink can therefore be efficiently used, resulting in reduced running cost. Further, ink jet recording apparatuses are not noisy. Accordingly, the ink jet recording method is an excellent image forming method.

There is a demand for an ink composition, which is curable by irradiation of active radiation rays such as ultraviolet rays with high sensitivity to form high-quality images (radiation-curable ink composition), which can be used for an ink composition for ink jet recording. Improvement in sensitivity of the radiation-curable ink compositions which cure by irradiation of active radiation rays gives rise to several advantages, including increased curability of the ink compositions, which leads to reduced power consumption and reduced load applied to an active radiation ray generator, thereby lengthening the lifetime of the generator, and suppressed vaporization of uncured low-molecular weight substances and deterioration in strength of images formed. In addition, when the radiation-curable ink composition is used to form image regions of a planographic printing plate, improved strength of images due to improved sensitivity leads to increased printing durability to the image regions.

As the UV-curable ink composition, there has been proposed, for example, an ink composition comprising a combination of monomers having different functional groups among the monofunctional or multifunctional monomers (see Japanese Patent Application Laid-Open (JP-A) No. 5-214280). Further, as the radiation-curable composition, there has been proposed a composition containing multifunctional acrylate (see JP-A No. 8-41133). Such ink compositions have all excellent curability, while the film formed therefrom has insufficient flexibility.

Conventionally, so-called PS plates each having an oleophilic photosensitive resin layer on a hydrophilic support are used, and the photosensitive resin layer is image-wise exposed to light to form exposed regions having increased or decreased solubility in an alkaline developing solution, and non-image regions are dissolved in the alkaline developing solution and removed in producing planographic printing plates. However, along with recent broad dissemination of digitization technology in which image information is electronically processed, stored and output with a computer, there is a need for a new image output method that corresponds to the digitization technology in producing the planographic printing plates. In particular, methods of producing a printing plate without use of a developing solution are under study, and a method in which a planographic printing plate is directly produced by using an ink composition for ink jet recording has been proposed. In this method, a desired image, which is preferably hydrophobic, is formed by image-wise ejecting an ink on the surface of a support, which is preferably hydrophilic, in an ink jet recording manner and irradiating the ink with active radiation rays to cure the ink.

In order to form image regions of a planographic printing plate, it is preferred that ink droplets ejected onto on the support cure rapidly without bleeding, and that the cured image regions have excellent strength and strong adhesiveness to the support, and that when the planographic printing plate is being loaded in a printing machine, the image regions conform to the deformation of the support without generating damage such as cracks. Accordingly, there is currently a need for an ink composition suitable for such applications.

SUMMARY OF THE INVENTION

The invention has been made in view of the circumstances described above. A first aspect of the invention is to provide an ink composition containing a polymerization initiator (A), a (meth)acrylate having a double bond with a carbon atom having an $sp^3$ hybrid orbital at an $\alpha$ position (B), and a colorant (C).

A second aspect of the invention is to provide an ink jet recording method, including (i-1) ejecting an ink composition of the invention onto a recording medium, and (i-2) irradiating the ink composition with an active radiation ray to cure the ink composition.

A third aspect of the invention is to provide a method for producing a planographic printing plate, including (ii-1) ejecting the ink composition of claim 1 onto a hydrophilic support, and (ii-2) irradiating the ink composition with an active radiation ray to cure the ink composition and thereby form a hydrophobic region.

A fourth aspect of the invention is to provide a planographic printing plate formed by curing the ink composition of the invention on a hydrophilic support.

DETAILED DESCRIPTION OF THE INVENTION

Hereinbelow, the ink composition, the ink jet recording method, and the method for producing a planographic printing plate, and the planographic printing plate according to the invention will be described in detail. Further, in the present specification, a phrase " . . . to . . . " represents a range including the numeral values represented before and after "to" as a minimum value and a maximum value, respectively.

1. Ink Composition

The present inventors have made extensive studies. As a result, they have achieved the invention by finding that by using a specific polymerizable compound in an ink composition, a composition can be obtained that has improved image flexibility after curing, while maintaining high sensitivity, and further has high adhesiveness of the image to a recording medium.

The ink composition of the invention comprises a polymerization initiator (A), a (meth)acrylate having a double bond with a carbon atom having an $sp^3$ hybrid orbital at an $\alpha$ position (B), and a colorant (C). The ink composition of the invention can be used as an ink composition for ink jet recording. Hereinbelow, the essential components for the ink composition of the invention will be described.

<(B) (Meth)Acrylate Having a Double Bond with a Carbon Atom Having an $sp^3$ Hybrid Orbital at an $\alpha$ Position>

The ink composition of the invention contains a (meth)acrylate having a double bond with a carbon atom having an $sp^3$ hybrid orbital at an $\alpha$ position, which is referred to as "a specific polymerizable compound", hereinafter.

The (meth)acrylate having a double bond with a carbon atom having an $sp^3$ hybrid orbital at an $\alpha$ position, which is a characteristic component in the invention (a specific polymerizable compound) will be described in detail.

As a specific polymerizable compound, any (meth)acrylate which has a double bond with a carbon atom having an $sp^3$ hybrid orbital at an $\alpha$ position can be used.

As used herein, the expression "double bond with a carbon atom having an $sp^3$ hybrid orbital at an $\alpha$ position" means that at least one atom that is not a hydrogen atom, and that is adjacent to a double bond (C=C) formed by two carbon atoms, is a carbon atom having an $sp^3$ hybrid orbital.

The specific polymerizable compound contains in its molecular structure at least one double bond with a carbon atom having an $sp^3$ hybrid orbital at an $\alpha$ position and at least one (meth)acrylate group. Moreover, as used herein, references to (meth)acrylate refer to either or both methacrylate and acrylate structures.

Next, the specific polymerizable compound will be described. The specific polymerizable compound can be represented by following formula (I).

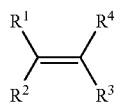
(I)

In formula (I), $R^1$ to $R^4$ each independently represent a hydrogen atom or an alkyl group. Here, all of $R^1$ to $R^4$ are not hydrogen atoms, and at least one alkyl group represented by $R^1$ to $R^4$ is bound to an acrylate group represented by following formula (II), or a methacrylate group represented by following formula (III), directly or via a bivalent linking group. Further, it is preferably that two or three of $R^1$ to $R^4$ are hydrogen atoms.

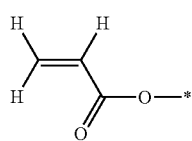
(II)

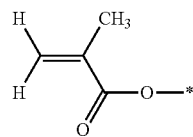
(III)

In the formula (II) or (III), * represents a binding site for the alkyl group represented by any one of $R^1$ to $R^4$, or for a linking group bound to the alkyl group.

The alkyl group represented by $R^1$ to $R^4$ is an alkyl group having 1 or more carbon atoms, preferably an alkyl group having 1 to 20 carbon atoms, and more preferably an alkyl group having 1 to 12 carbon atoms. Preferable examples of the alkyl group include a methyl group, an ethyl group, an n-butyl group, an n-octyl group, an n-hexyl group, and an n-nonyl group.

Two or more alkyl groups represented by $R^1$ to $R^4$ may be bound to each other to form a ring structure. The ring structure is preferably a 3 to 12-membered ring, more preferably a 4 to 8-membered ring, and even more preferably a 5 to 7-membered ring. The ring structure may form a condensed ring structure, thereby forming a bicyclic backbone or tricyclic backbone. The specific polymerizable compound is preferably one having the ring structure as described above.

At least one alkyl group represented by $R^1$ to $R^4$ is bound to the acrylate group represented by the formula (II), or the methacrylate group represented by the formula (III), directly or via a bivalent linking group. The bivalent linking group is preferably an alkylene group in which a hydrogen atom has been removed from the alkyl group represented by $R^1$ to $R^4$, and preferably having 1 to 20 carbon atoms. The methylene group (—$CH_2$—) in the alkylene group may be replaced with a bivalent group selected from —O—, —S—, and —$NR^5$—, and in one preferable embodiment, it may be replaced with an ether bond (—O—).

$R^5$ indicates the case when $R^1$ to $R^4$ are alkyl groups. As the alkylene group, specifically an alkylene group having about 3 to 12 carbon atoms is preferred, and examples thereof include a propylene group, butylene group, an octylene group, and a nonylene group, and among these alkylene groups, the methylene group may be replaced with above-described bivalent group selected from —O—, —S—, and —$NR^5$—.

The bivalent linking group may be a bivalent linking group in a combination of two or more kinds thereof. This bivalent linking group may contain a group having a double bond with a carbon atom having an $sp^3$ hybrid orbital at an $\alpha$ position within its structure. In this case, it contains two or more double bonds with carbon atoms having $sp^3$ hybrid orbitals at $\alpha$ positions within one molecule of the specific polymerizable compound.

The alkyl group represented by $R^1$ to $R^4$, and the bivalent linking group may further have a substituent. Examples of preferable substituents include an alkyl group, an alkoxy group, an aryl group, an aryloxy group, an acyl group, an amino group, a hydroxyl group, a cyano group, a nitro group, and a halogen atom. If the substituent can be introduced, the acrylate group represented by the formula (II) or the methacrylate group represented by the formula (III) may be contained as a further substituent at the terminal of the substituent.

The alkyl group represented by $R^1$ to $R^4$, or the bivalent linking group, may have as a substituent a group having a double bond with carbon atoms having an $sp^3$ hybrid orbitals at $\alpha$ positions (for example, an alkenyl group). In this case, the group contains two or more double bonds with carbon atoms having $sp^3$ hybrid orbital at an α position within one molecule of the specific polymerizable compound.

The number of the double bonds with carbon atoms having $sp^3$ hybrid orbitals at α positions in the specific polymerizable compound is preferably 1 to 8, more preferably 1 to 4, still more preferably 1 to 2, and most preferably 1, in consideration of the balance between sensitivity to irradiation with activation radiation during ink curing and flexibility of the cured area after ink curing. The double bond with a carbon atom having an $sp^3$ hybrid orbital at an α position may be at the terminal or in the chain of the molecular structure of the specific polymerizable compound.

In the specific polymerizable compound, the number of the acrylate groups represented by the formula (II) or the number of the methacrylate groups represented by the formula (III) is preferably 1 to 4, more preferably 1 to 2, and even more preferably 1, in consideration of the balance between sensitivity to irradiation with activation radiation during ink curing and the flexibility of the cured area after ink curing.

Specific examples of the specific polymerizable compound that is preferably used in the invention are as follows [Exemplary compounds (B-1) to (B-27)], but the invention is not limited thereto. Further, if each of the Exemplary compounds exists as various steric isomers, any one of the steric isomers may be used, and a mixture of the steric isomers may also be used.

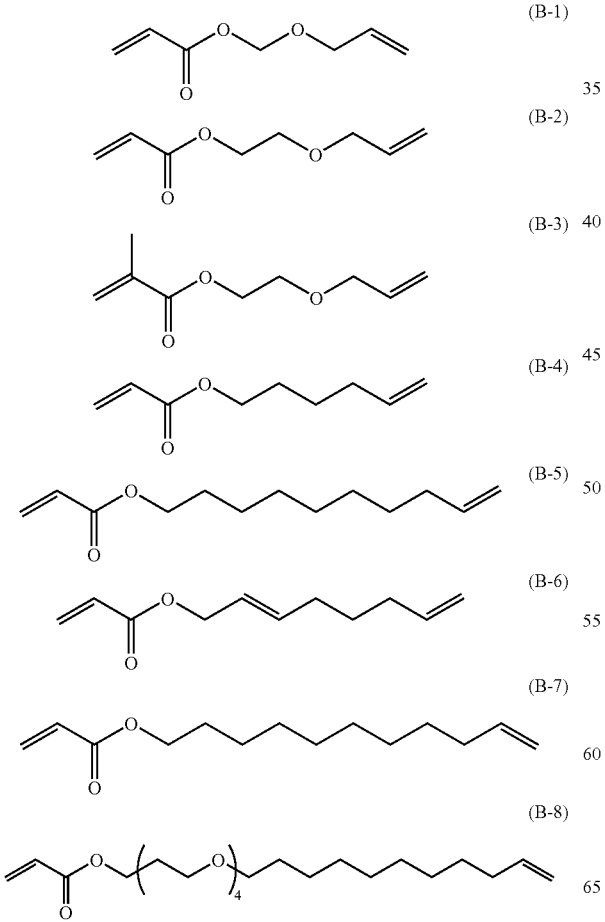

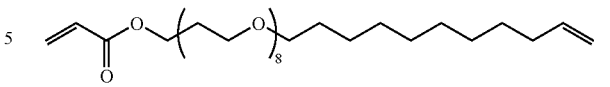
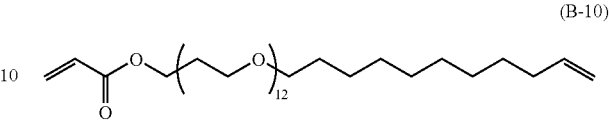
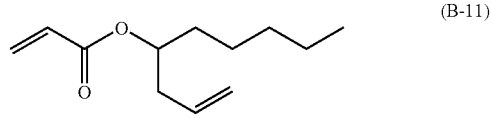
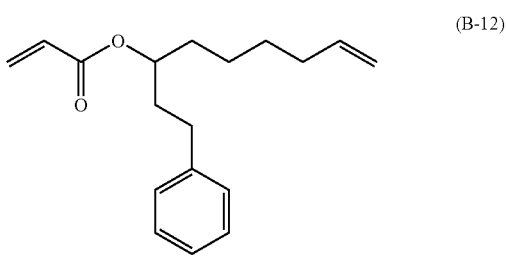
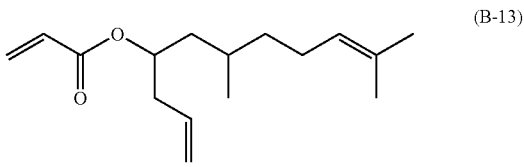
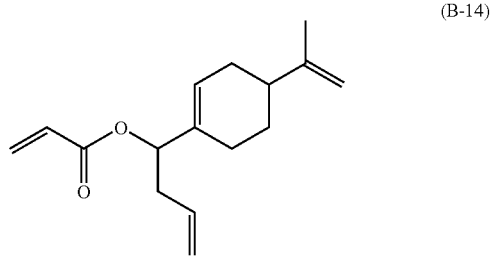
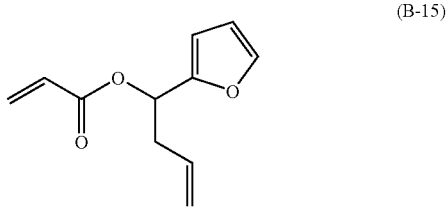
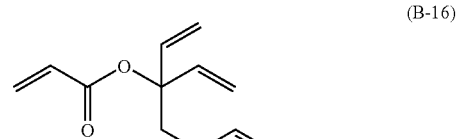
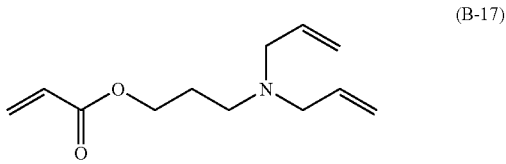

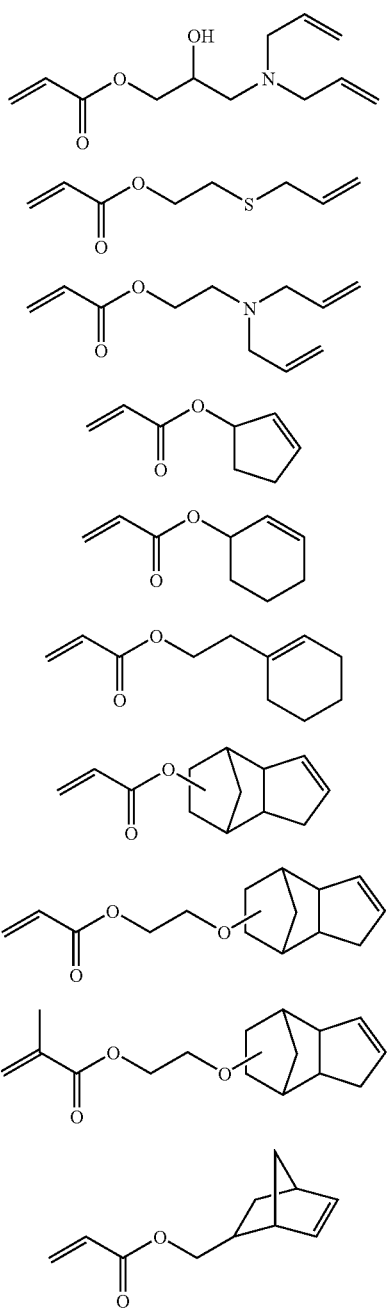

Among the above exemplary compounds, exemplary compounds (B-7), (B-8), (B-9), (B-10), (B-24) and (B-25) are preferable, exemplary compounds (B-7), (B-8), (B-9) and (B-10) are more preferable, and exemplary compound (B-7) is particularly preferable.

The specific polymerizable compound can be prepared by, for example, a known organic synthesis method such as an acid catalytic dehydration condensation method as described in JP-A No. 63-211252, an acid chloride method, and an esterification method. Specifically, it can be prepared from a (meth)acrylic acid derivative, and an alcohol that contains a double bond with a carbon atom having an $sp^3$ hybrid orbital at an α position within its molecule, an oxirane compound, or an oxetane compound by a well known organic synthesis method.

Example of the (meth)acrylic acid derivative include, in addition to (meth)acrylic acid, (meth)acrylic acid chloride, (meth)acrylic acid anhydride, and (meth)acrylic acid ester. If the (meth)acrylic acid is used, an acid catalytic condensation reaction with an alcohol that contains a double bond with a carbon atom having an $sp^3$ hybrid orbital at an α position within its molecule, or a ring opening reaction with an oxirane compound or an oxetane compound is preferably performed.

If the (meth)acrylic acid chloride or the (meth)acrylic acid anhydride is used, an esterification reaction with an alcohol that contains a double bond with a carbon atom having an $sp^3$ hybrid orbital at an α position within its molecule in the presence of a base catalyst is preferably performed.

The (meth)acrylic acid ester is preferably methyl methacrylate, and an esterification reaction with an alcohol that contains a double bond with a carbon atom having an $sp^3$ hybrid orbital at an α position within its molecule in the presence of various catalysts is preferably performed.

The content of the specific polymerizable compound of the ink composition of the invention is preferably in the range of 3 to 45% by mass and more preferably in the range of 5 to 35% by mass from the viewpoint of attaining a good balance between curing speed and adhesiveness to a substrate, and the viewpoint of compatibility of the ink composition with ink jet recording. These specific polymerizable compounds may be used alone, or in a combination of two or more thereof.

<(A) Polymerization Initiator>

The ink composition of the invention contains at least one polymerization initiator. Any one of known polymerization initiators may be suitably selected and used as each of the at least one polymerization initiator, according to the kind of the polymerizable compound used in combination and the application of the ink composition. The polymerization initiator is preferably a radical polymerization initiator in the invention.

The polymerization initiator used in the ink composition of the invention absorbs external energy to generate polymerization-initiating species. Examples of the external energy used to initiate polymerization are roughly classified into heat and radiation rays. For heat and radiation rays, a thermal polymerization initiator and a photopolymerization initiator are used respectively. Examples of the radiation rays include γ-rays, β-rays, electron beams, ultraviolet rays, visible rays, and infrared rays. As the thermal or photopolymerization initiator, any one of known compounds can be used.

Examples of the radical polymerization initiator that can be preferably used in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds containing at least one carbon-halogen bond, and (m) alkylamine compounds. These radical polymerization initiators may be used alone, or in a combination of two or more thereof.

The content of the polymerization initiator (A) of the invention is preferably in the range of 0.01 to 35% by mass, more preferably 0.1 to 30% by mass, and still more preferably 0.5 to 30% by mass with respect to 100% by mass of the total amount of the specific polymerizable compound (B) and the component (C), or if these components are combined with other polymerizable compounds (D), of the total amount of the specific polymerizable compound (B), the component (C), and other polymerizable compounds (D).

The ink composition may further contain a sensitizing dye (E), which will be described later, if desired, and the polymerization initiator (A) and the sensitizing dye (E) are contained at a weight ratio of 200:1 to 1:200, preferably 50:1 to 1:50, and more preferably 20:1 to 1:5.

<(C) Colorant>

The ink composition of the invention contains a colorant. There is no particular limit to the colorant(s) that can be used in the invention. However, each of the at least one colorant is preferably a pigment (C-1) or an oil-soluble dye (C-2), which has good weather resistance and color reproducibility, and may be any one of those known as such, including soluble dyes. A compound not functioning as a polymerization inhibitor in polymerization reaction, which is curing reaction, is preferably selected as each of the at least one colorant for use in the ink composition of the invention in order to prevent a decrease in sensitivity of curing reaction caused by active radiation rays.

(C-1) Pigment

There is no particular limit to the pigment for use in the invention, but examples thereof include organic and inorganic pigments described in Color Index and having the following numbers:

As for red and magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36. As for blue and cyan pigments, the pigment may be Pigment Blue 1, 15, 15:1, 15:2, 15:3, 15:4, 15:6, 16, 17-1, 22, 27, 28, 29, 36, or 60. As for green pigments, the pigment may be Pigment Green 7, 26, 36, or 50. As for yellow pigments, the pigment may be Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193. As for black pigments, the pigment may be Pigment Black 7, 28, or 26. As for white pigments, the pigment may be Pigment White 6, 18, or 21.

(C-2) Oil-Soluble Dye

The oil-soluble dye for use in the invention will be described. The oil-soluble dye for use in the invention is substantially insoluble in water. Specifically, the solubility of the oil-soluble dye in water kept at 25° C. (the weight of the dye soluble in 100 g of water) is 1 g or less, preferably 0.5 g or less, and more preferably 0.1 g or less. Thus, examples of the oil-soluble dye include so-called water-insoluble pigments and oil-soluble colorants. Among them, the oil-soluble dye is preferably an oil-soluble colorant.

When the oil-soluble dye for use in the invention is a yellow dye, the yellow dye may be any one of those known as such. Examples thereof include aryl- and heteryl-azo dyes each having as the coupling moiety a phenol, naphthol, aniline, pyrazolone, pyridone, or open-chain active methylene moiety; azomethine dyes having as the coupling moiety an open-chain active methylene moiety; methine dyes such as benzylidene dyes and monomethine oxonol dyes; quinone dyes such as naphthoquinone dyes and anthraquinone dyes; quinophtharone dyes; nitro and nitroso dyes; acridine dyes; and acridinone dyes.

When the oil-soluble dye for use in the invention is a magenta dye, the magenta dye may be any one of those known as such. Examples thereof include aryl- and heteryl-azo dyes each having as the coupling moiety a phenol, naphthol, or aniline moiety; azomethine dyes having as the coupling moiety a pyrazolone or pyrazolotriazole moiety; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye for use in the invention is a cyan dye, the cyan dye may be any one of those known as such. Examples thereof include azomethine dyes such as indoaniline dyes, indophenol dyes, and dyes having a pyrrolotriazole moiety as the coupling moiety; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- and heteryl-azo dyes each having as the coupling moiety a phenol, naphthol, or aniline moiety; and indigo and thioindigo dyes.

The dye may be a compound having chromophore (color-forming atomic group) that dissociates to form a color such as yellow, magenta, or cyan. In this case, the dye has a counter cation, which may be an inorganic cation such as an alkali metal or an ammonium group, or an organic cation such as a pyridinium group or a quaternary ammonium salt, or a polymeric cation having, as the partial structure, a cation selected from those described above.

Typical examples thereof include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2. Examples of products serving as such colorants include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries, Ltd.); AIZEN SPILON BLUE GNH (manufactured by Hodogaya Chemical Co., Ltd.); and NEOPEN YELLOW 075, NEOPEN MAZENTA SE1378, NEOPEN BLUE 808, NEOPEN BLUE FF4012, and NEOPEN CYAN FF4238 (manufactured by BASF).

In the invention, one of these oil-soluble dyes may be used alone, or two or more of them can be used together.

When the ink composition of the invention comprises an oil-soluble dye as the colorant, the ink composition may further contain other colorant(s) such as a water-soluble dye, a disperse dye, or a pigment, if desired, in an amount that does not impair the advantageous effects of the invention. The ink composition of the invention may contain at least one disperse dye in such an amount that the at least one disperse dye can be dissolved in a water-immiscible organic solvent or solvents. Examples of the disperse dye generally include water-soluble dyes. However, the disperse dye is preferably used in such an amount that it can be dissolved in the water-immiscible organic solvent in the invention, as described above. Preferable specific examples of the disperse dye include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Preferably, the colorant usable in the invention is added to other components of the ink composition or the ink composition for ink jet recording of the invention, and then appropriately dispersed therein. Any of various dispersing machines, such as a ball mill, a sand mill, an attritor, a roll mill, an agitator, a Henschel mixer, a colloid mill, an ultrasonic wave homogenizer, a pearl mill, a wet-type jet mill, or a paint shaker, may be used to disperse the colorant.

In addition, the ink composition of the invention may further contain at least one dispersant to disperse the colorant therein. There is no particular limit to the types of the dispersants. However, the dispersant is preferably a polymeric dispersant. The polymer dispersant is, for example, one of Solsperse series manufactured by Noveon. When the ink composition of the invention contains a pigment, the ink composition may further contain, as a dispersion aid, at least one synergist suitable for the type of the pigment. In the invention, the total amount of the dispersant(s) and the dispersion aid(s) is preferably 1 to 50% by mass with respect to 100% by mass of the colorant(s).

In preparing the ink composition of the invention, the colorant may be added to the other components of the ink composition as it is. Alternatively, to improve the dispersion state of the colorant, the colorant may be added to a solvent or a dispersion medium or media such as the particular polymerizable compound for use in the invention or other polymerizable compound, which is added as needed, and uniformly dispersed or dissolved therein, and the resultant may be then added to the other components.

In the invention, the colorant is preferably added to and mixed with one of at least one polymerizable compound including specific polymerizable compounds and the component (D), or a mixture thereof to avoid use of a solvent, which may remain in a cured image and degrade the solvent resistance of the image, and problems regarding volatile organic compounds (VOC). When only dispersibility is considered, other polymerizable compound is preferably a monomer having the lowest viscosity.

One or more of those colorants may be used according to the application of the ink composition.

Further, when the ink composition includes a colorant that remains as solid therein, such as a pigment, it is preferable that the types of the colorant, a dispersant, and a dispersion medium, and dispersion and filtration conditions are so properly selected as to control the average diameter of the colorant particles within the range of 0.005 to 1.5 µm. The average diameter is more preferably 0.01 to 1.2 µm, and still more preferably 0.015 to 1.0 µm. Controlling the average diameter of the colorant particles can suppress clogging of a nozzle head and allows preservation of the storage stability, transparency and curing sensitivity of the ink.

A desired content for the colorant(s) in the ink composition of the invention may be determined properly according to the application of the ink composition. The content of the colorant(s) in the solid matter of the ink composition is preferably 1 to 10% by mass, and more preferably 2 to 8% by mass with respect to the total weight of the ink composition, considering the physical properties and the coloring property of the ink composition.

The ink composition of the invention may further contain other component(s) as well as the essential components to, for example, improve the physical properties of the ink composition, unless the component(s) does not impair the advantageous effects of the invention. Additional components that the ink composition may contain will be described below.

<(D) Other Polymerizable Compound>

The ink composition of the invention preferably contains other polymerizable compounds in addition to the specific polymerizable compounds. Examples of other polymerizable compounds include radical and cationic polymerizable compounds. The type of other polymerizable compound is selected properly in consideration of desired properties or compatibility with respect to the polymerization initiator(s) used.

In the invention, the total content of the polymerizable compounds, that is, the total content of the specific polymerizable compounds and other polymerizable compounds, is 45 to 95% by mass, and more preferably 50 to 90% by mass, with respect to the total weight of the ink composition of the invention.

In the invention, the content of the specific polymerizable compounds is 10 to 60% by mass, preferably 15 to 50% by mass, and more preferably 25 to 35% by mass, with respect to the total content of the polymerizable compounds contained in the ink composition (that is, the total content of the specific polymerizable compounds and other polymerizable compounds).

Other polymerizable compounds for use in the invention will be described below. The radical polymerizable compound has at least one radical polymerizable ethylenic unsaturated bond in the molecule thereof. The radical polymerizable compound may be in the form of a monomer, an oligomer, or a polymer. Only one radical polymerizable compound may be used alone. Alternatively, two or more radical polymerizable compounds may be used together at an arbitrary ratio to improve at least one of the properties of the ink composition. Combined use of two or more radical polymerizable compounds is preferable to control reactivity and the physical properties of the ink composition.

The polymerizable compound having at least one radical polymerizable ethylenic unsaturated bond may be an unsaturated carboxylic acid such as acrylic acid, methacrylic acid, itaconic acid, crotonic acid, isocrotonic acid or maleic acid or a salt thereof, an anhydride having at least one ethylenic unsaturated group, acrylonitrile, styrene, an unsaturated polyester, unsaturated polyethers, an unsaturated polyamide, an unsaturated urethane, an N-vinylamide, or an N-vinyllactam.

Specific examples thereof include acrylic acid derivatives such as 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane (with a weight average molecular weight of more than 360), polyethylene glycol diacrylate (with a weight average molecular weight of more than 360), polypropylene glycol diacrylate (with a weight average molecular weight of more than 360), dipentaerythritol tetraacrylate, trimethyrolpropane triacrylate, oligoester acrylates, N-methylol acrylamide, diacetone acrylamide, and epoxy acrylates; methacrylic acid derivatives such as methyl methacrylate, n-butyl methacrylate, allyl methacrylate, glycidyl methacrylate, benzyl methacrylate, dimethylaminomethyl methacrylate, polyethylene glycol dimethacrylate (with a weight average molecular weight of more than 360), polypropylene glycol dimethacrylate (with a weight average molecular weight of more than 360), and 2,2-bis(4-methacryloxypolyethoxyphenyl)propane (with a weight average molecular weight of more than 360); N-vinyllactams such as N-vinylcaprolactam and N-vinylpyrrolidone; N-vinylamides such as N-vinylacetamide and N-vinylformamide; and derivatives of allyl compounds such as allyl glycidyl ether, diallyl phthalate, and triallyl trimellitate. More specifically, radical polymerizable or cross-linkable monomers, oligomers and polymers commercially available or known in the art, including those described in Cross-linking Agent Handbook edited by Shinzo Yamashita and published by Taisei Publisher in 1981, UV or EB Curing Handbook (Raw Material Book) edited by Kiyomi Kato and published by Kobunshi Kankokai in 1985, Application and Market of UV or EB Curing Technology (p. 79) edited by RadTech Japan published by CMC publisher in 1989, and Polyester Resin Handbook written by Eiichiro Takiyama and published by Nikkankogyo Shimbun in 1988, can also be used as such.

As the radical polymerizable compound, optically curable, polymerizable compound materials used in the photopolymerizable compositions as described in JP-A No. 7-159983, Japanese Patent Application Publication (JP-B) No. 7-31399, JP-A Nos. 8-224982, 10-863, 09-134011, etc. are known, and these may be also used in the ink composition of the invention.

As the radical polymerizable compound, a vinyl ether compound can be preferably used. Examples of the vinyl ether compound include di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethylvinyl ether, n-butylvinyl ether, isobutylvinyl ether, octanedecylvinyl ether, cyclohexylvinyl ether, hydroxybutylvinyl ether, 2-ethylhexylvinyl ether, cyclohexanedimethanol monovinyl ether, n-propylvinyl ether, isopropylvinyl ether, isopropenylether-O-propylene carbonate, dodecylvinyl ether, diethylene glycol monovinyl ether, and octanedecylvinyl ether. Of these vinyl ether compounds, when taking into account of curability, adhesion property, and surface hardness, di- or trivinyl ether compounds are preferred, and divinyl ether compounds are particularly preferred. The foregoing vinyl ether compounds may be used individually or in a combination of two or more kinds thereof.

As other polymerizable compounds, (meth)acrylic esters (referred to as the acrylate compound, hereinafter) of a (meth)acrylic monomer or prepolymer, an epoxy monomer or prepolymer, or an urethane monomer or prepolymer may be used, and examples thereof include the following compounds.

Specifically, examples of other polymerizable compounds include 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethylphthalic acid, methoxy-polyethyleneglycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, nonylphenol EO adduct acrylate, modified glycerine triacrylate, bisphenol A diglycidyl ether acrylic acid adduct, modified bisphenol A diacrylate, phenoxy-polyethylene glycol acrylate, 2-acryloyloxyethyl hexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylolpropane tetraacrylate, pentaerythritol triacrylate hexamethylene diisocyanate urethane prepolymer, stearyl acrylate, isoamyl acrylate, isomyristyl acrylate, isostearyl acrylate, and lectone-modified acrylate.

Preferably, these acrylate compounds have less skin irritation and less sensitizing property (less causing rash) than polymerizable compounds used in conventional UV-curable inks. Further, the viscosity of each of the acrylate compounds can be relatively low, and the acrylate compounds allow ink to be stably ejected, and have high polymerization sensitivity, and strong adhesiveness to recording media.

The monomers listed as other polymerizable compounds have a low sensitizing property, high reactivity, a low viscosity, and strong adhesiveness to recording media, regardless of their having low molecular weight.

To further improve sensitivity, ink bleeding resistance, and adhesiveness to recording media, especially sensitivity and adhesiveness to recording media, it is preferable to use at least one of multifunctional acrylate monomers and oligomers having molecular weight of 400 or more, preferably 500 or more, together with at least one of the aforementioned monoacrylates as other polymerizable compound components. In particular, it is preferable that an ink composition used to record images on a soft recording medium such as a PET or PP film contains not only at least one monoacrylate selected from the aforementioned compounds, at least one selected from the above-described specific polymerizable compounds (B), and multifunctional acrylate monomers and oligomers selected from the components (D), so as to obtain a film having flexibility, strong adhesiveness and strength.

In a preferable embodiment, at least one monofunctional monomer, at least one bifunctional monomer, and at least one tri- or higher-functional monomer are used in combination for a polymerizable compound to further improve sensitivity, ink bleeding resistance, and adhesiveness to recording media.

The monoacrylate is preferably stearyl acrylate, isoamyl acrylate, isomyristyl acrylate, or isostearyl acrylate because it has high sensitivity and low contractility, and can prevent curling and ink bleeding, and can reduce odor of printed matters and cost of an irradiation apparatus. Epoxy or urethane acrylate oligomer is particularly preferably used as the oligomer used in combination with the monoacrylate. Methacrylates have desirably less skin irritation than acrylates.

Among the above compounds, it is preferable to use a mixture containing alkoxy acrylate in a content of less than 70% by mass, and acrylate in the remaining portion, to obtain an ink composition having good sensitivity, bleeding resistance, and odor resistance. Further, it is preferable to use N-vinyllactams such as N-vinylcaprolactam and N-vinylpyrrolidone, and more preferable to use N-vinylcaprolactam, from the viewpoint of reducing the viscosity of the ink composition, and improving the physical properties of cured film such as adhesiveness to a recording medium, and flexibility after curing.

In the invention, if the above-described acrylate compound is used as other polymerizable compounds, the content of the acrylate compound is preferably 30% by mass or more, more preferably 40% by mass or more, and still more preferably 50% by mass or more, with respect to the total weight of other polymerizable compounds [that is, the total weight of the components (D)]. The ink composition of the invention may contain only the acrylate compound as the polymerizable compound used in combination.

Further, the polymerization initiator and the polymerizable compound are selected in the invention according to various purposes (for example, for the purpose of preventing the decrease in sensitivity due to the light-shielding effect of the colorant(s) in the ink composition). For example, the ink composition may contain a combination of a cationic polymerizable compound and a cationic polymerization initiator, a combination of a radical polymerizable compound and a radical polymerization initiator, or may be a radical-cationic hybrid curable ink containing the both combinations.

The cationic polymerizable compound for use in the invention is required to initiate polymerization reaction in the presence of the acid generated by the agent that optically generates acid and to cure, and otherwise there is no particular limit thereto. The cationic polymerizable compound can be any of cationic polymerizable monomers known as photo-cationic polymerizable monomers. Examples of the cation polymerizable monomers include epoxy compounds, vinyl ether compounds, and oxetane compounds described in JP-A Nos. 6-9714, 2001-31892, 2001-40068, 2001-55507, 2001-310938, 2001-310937, 2001-220526, etc.

Further, as the cationic polymerizable compound, polymerizable compounds which are applied in cationic polymerizable photo-curable resins are known. Recently, for example, polymerizable compounds which are applied in photo-cationic-polymerizable photo-curable resins sensitized in the visible light wavelength range of 400 nm or more are disclosed in JP-A Nos. 6-43633 and 08-324137. These compounds can also be used in the ink composition of the invention.

In the invention, as the cationic polymerization initiator (agent that optically generates acid) which can be used in combination when using the cationic polymerizable compound, for example, the compounds used in chemically amplified photoresists or optical cationic polymerization (see pages 187 to 192 of Organic Materials for Imaging edited by The Japanese Research Association for Organic Electronics Materials and published by Bun-Shin Shuppan in 1993) are used. Preferable examples of the cationic polymerization initiator suitable for the invention include the following compounds.

First, $B(C_6F_5)_4^-$, $PF_6^-$, $AsF_6^-$, $SbF_6^-$, and $CF_3SO_3^-$ salts of aromatic onium compounds (e.g., diazonium, ammonium, iodonium, sulfonium, and phosphonium) can be used. Second, sulfonated compounds that generate sulfonic acid may be used. Third, halogenated compounds that optically generate hydrogen halides can be used. Fourth, iron-allene complexes may be used.

These cationic polymerization initiators may be used individually or in combination of two or more kinds thereof.

<(E) Sensitizing Dye>

The ink composition of the invention may contain a sensitizing dye to accelerate the decomposition of the polymerization initiator caused by irradiation of active rays. The sensitizing dye absorbs particular active radiation rays and is then electronically excited. When the electronically excited sensitizing dye comes into contact with a polymerization initiator, electron transfer, energy transfer, and heat generation occur. As a result, the polymerization initiator chemically changes, that is, decomposes, and generates radicals, acid or base.

The type of the sensitizing dye can be determined in consideration of the wavelength of active radiation rays used to cause the polymerization initiator contained in the ink composition to generate initiation species. Considering the sensitizing dye being used for curing reaction of an ordinary ink composition, the sensitizing dye is preferably one of the following compounds that have an absorption wavelength in the range of 350 to 450 nm.

Examples of the sensitizing dye include polynuclear aromatic compounds (such as anthracene, pyrene, perylene, and triphenylene), thioxanthones (such as isopropylthixanthone), xanthenes (such as fluorescein, eosin, erythrocin, rhodamine B, and rose bengal), cyanines (such as thiacarbocyanine and oxacarbocyanine), merocyanines (such as merocyanine and carbomerocyanine), thiazines (such as thionine, methylene blue, and toluidine blue), acridines (such as acridine orange, chloroflavine, and acriflavine), anthraquinones (such as anthraquinone), and squaliums (such as squalium), and coumarins (such as 7-diethylamino-4-methylcoumarin), and among these, polynuclear aromatic compounds and thioxanthones are preferred.

Further preferable examples of the sensitizing dye include the compounds represented by following formulae (IV) to (VIII).

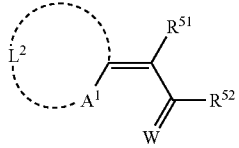

(IV)

In Formula (IV), $A^1$ represents a sulfur atom or $NR^{50}$; $R^{50}$ represents an alkyl group or an aryl group; $L^2$, together with the neighboring $A^1$ and carbon atom, represents a non-metal atomic group that forms the basic nucleus of a dye; $R^{51}$ and $R^{52}$ independently represent a hydrogen atom or a monovalent non-metal atomic group; and $R^{51}$ and $R^{52}$ may bond each other to form the acidic nucleus of the dye. W represents an oxygen or sulfur atom.

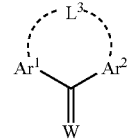

(V)

In Formula (V), $Ar^1$ and $Ar^2$ respectively represent aryl groups that are bound to each other via an $-L^3$-bond; and $L^3$ represents —O— or —S—. W has the same meaning as in Formula (IV).

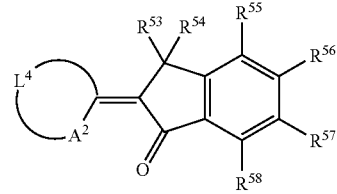

(VI)

In Formula (VI), $A^2$ represents a sulfur atom or $NR^{59}$; $L^4$, together with the neighboring $A^2$ and carbon atom, represents a non-metal atomic group that forms the basic nucleus of a dye; $R^{53}$, $R^{54}$, $R^{55}$, $R^{56}$, $R^{57}$ and $R^{58}$ independently represent a monovalent non-metal atomic group; and $R^{59}$ represents an alkyl or an aryl group.

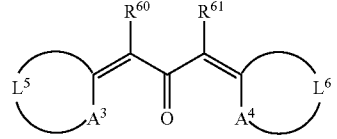

(VII)

In Formula (VII), $A^3$ and $A^4$ independently represent —S—, —$NR^{62}$, or $NR^{63}$; $R^{62}$ and $R^{63}$ independently represent a substituted or unsubstituted alkyl group or a substituted or unsubstituted aryl group; $L^5$ and $L^6$, together with the corresponding one of the neighboring $A^3$ and $A^4$, and the neighboring carbon atom, independently represent a non-metal atomic group that forms the basic nucleus of a dye; and $R^{60}$ and $R^{61}$ independently represent a hydrogen atom or a monovalent non-metal atomic group, or may bind to each other to form an aliphatic or aromatic ring.

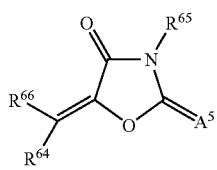
(VIII)

In Formula (VIII), $R^{66}$ represents an aromatic or hetero ring that may have at least one substituent; $A^5$ represents an oxygen or sulfur atom, or —$NR^{67}$—. $R^{64}$, $R^{65}$ and $R^{67}$ independently represent a hydrogen atom or a monovalent non-metal atomic group; and $R^{67}$ and $R^{64}$, and $R^{65}$ and $R^{67}$ may bind to each other to form an aliphatic or an aromatic ring.

Preferable specific examples of the compounds represented by Formulae (IV) to (VIII) include the compounds below.

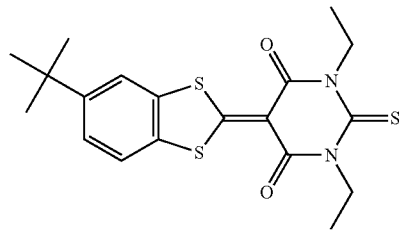
(E-1)

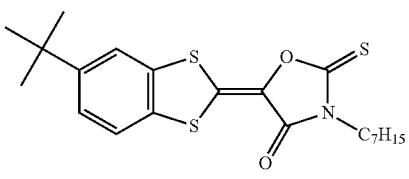
(E-2)

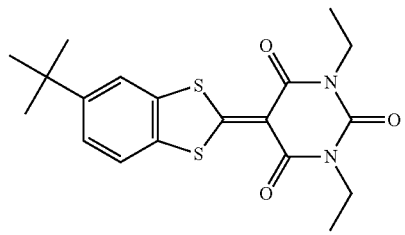
(E-3)

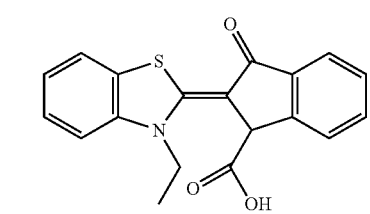
(E-4)

-continued

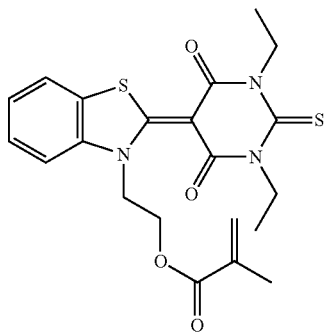
(E-5)

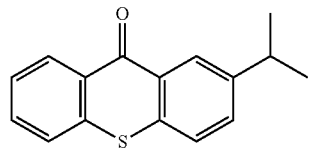
(E-6)

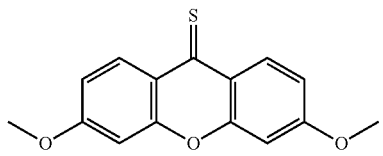
(E-7)

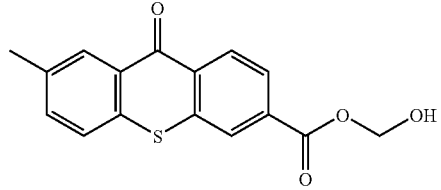
(E-8)

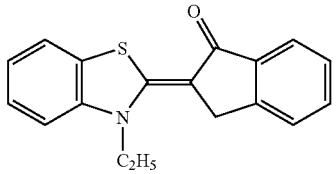
(E-9)

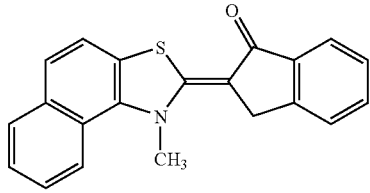
(E-10)

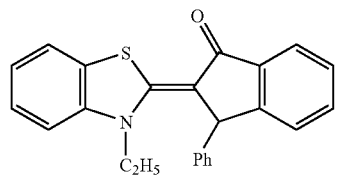
(E-11)

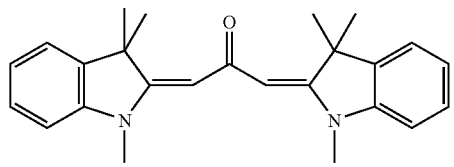
(E-12)

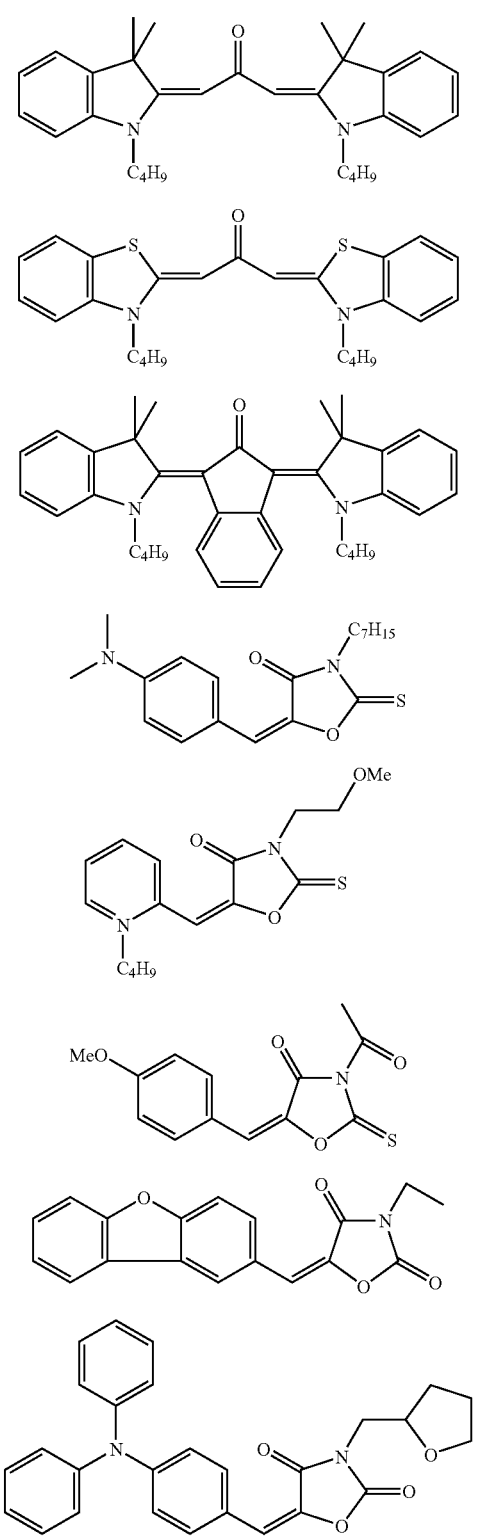

<(F) Co-Sensitizer>

The ink composition of the invention may contain a co-sensitizer. The co-sensitizer has function of improving the sensitivity of the sensitizing dye to active radiation rays, or preventing oxygen from inhibiting polymerization of the polymerizable compound.

Examples of the co-sensitizer include amines, such as those described in Journal of Polymer Society written by M. R, Sander et al., vol. 10, p. 3173, (1972), JP-B No. 44-20189, JP-A Nos. 51-82102, 52-134692, 59-138205, 60-84305, 62-18537, and 64-33104 and Research Disclosure 33825. Specific examples thereof include triethanolamine, ethyl p-dimethylaminobenzoate, p-formyldimethylaniline, and p-methylthiodimethylaniline.

The co-sensitizer can also be thiols or sulfides, such as thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

The co-sensitizer can also be amino acid compounds (e.g., N-phenylglycine), organic metal compounds described in JP-B No. 48-42965 (e.g., tributyltin acetate), hydrogen-donating compounds described in JP-B No. 55-34414, sulfur compounds described in JP-A No. 6-308727 (e.g., trithiane), phosphorus compounds described in JP-A No. 6-250387 (e.g., diethyl phosphite), and Si—H and Ge—H compounds described in JP-A No. 8-65779.

<(G) Other Components>

The ink composition of the invention may further contain other component(s), if necessary. Examples of other components include a polymerization inhibitor, and a solvent.

The polymerization inhibitor may be added to improve the storability of the ink composition. When the ink composition of the invention is used in ink jet recording, the ink composition is preferably heated at a temperature in the range of 40 to 80° C. to lower the viscosity thereof and then ejected. In such a case, the ink composition preferably contains at least one polymerization inhibitor to prevent head clogging due to thermal polymerization. The amount of the polymerization inhibitor(s) is preferably 200 to 20,000 ppm with respect to the total amount of the ink composition of the invention. Examples of the polymerization inhibitor include hydroquinone, benzoquinone, p-methoxyphenol, TEMPO, TEMPOL, and cupferron Al.

Considering that the ink composition of the invention is radiation-curable ink compositions, it is preferable that these ink compositions contain no solvent. This is because disuse of a solvent allows the ink composition to react and cure on being deposited on a recording medium. However, the ink composition may contain a predetermined solvent as long as the solvent does not adversely affect the curing speed of the ink composition. In the invention, the solvent may be an organic solvent or water. In particular, an organic solvent may be contained in the ink composition to improve adhesiveness of the ink composition to a recording medium (e.g., support such as paper). Use of an organic solvent is effective to avoid problems regarding VOC. The content of the organic solvent is, for example, in the range of 0.1 to 5% by mass, and preferably in the range of 0.1 to 3% by mass with respect to the total weight of the ink composition of the invention.

In addition, the ink composition of the invention may further comprise other known compound(s), if necessary. Examples of such additional compounds include at least one surfactant, at least one leveling additive, at least one matting agent, and at least one resin to adjust the physical properties of a film obtained by curing the ink composition, such as polyester resin, polyurethane resin, vinyl resin, acrylic resin, rubber resin, and wax. Further, the ink composition preferably contains at least one tackifier that does not inhibit polymerization in view of improvement in adhesiveness to recording media made of, for example, polyolefin or PET. Specific examples thereof include high-molecular weight adhesive polymers described in JP-A No. 2001-49200, pp. 5 to 6 (e.g., a copolymer of ester of (meth)acrylic acid and alcohol having at least one alkyl group with 1 to 20 carbon atoms, a copolymer of ester of (meth)acrylic acid and alicyclic alcohol having 3 to 14 carbon atoms, and a copolymer of ester of (meth) acrylic acid and aromatic alcohol having 6 to 14 carbon atoms), and low-molecular weight adhesive resins having polymerizable unsaturated bonds.

<Properties of Ink Composition>

The ink composition of the invention can be properly used as an ink for ink jet recording. Preferred physical properties in such an embodiment will be described.

When the ink composition of the invention is used as an ink for ink jet recording, the ink composition preferably has good ejectability. To attain this, the viscosity of the ink composition is preferably 7 to 30 mPa·s, and more preferably 7 to 25 mPa·s at the ejection temperature, which is for example, within the range of 40 to 80° C., and preferably within the range of 25 to 50° C. The viscosity of the ink composition of the invention at room temperature, which is within the range of 25 to 30° C., is preferably 35 to 500 mPa·s, and more preferably 35 to 200 mPa·s.

It is preferable that the composition of the ink composition is so adjusted as to obtain a viscosity within the above range. When the ink composition has a high viscosity at room temperature, the ink composition can be prevented from penetrating into a recording medium, even when the recording medium is porous. In addition, the amount of uncured monomer molecules and odor can be reduced. Further, bleeding of deposited ink droplets can be suppressed to consequently improve image quality.

The surface tension of the ink composition of the invention is preferably from 20 to 30 mN/m and more preferably from 23 to 28 mN/m. When a recording medium is made of polyolefin, PET, coated paper, or non-coated paper, the surface tension of the ink composition is preferably 20 mN/m or more in view of prevention of bleeding and penetration of the ink composition, or 30 mN/m or less in view of wettability of the ink composition.

2. Ink Jet Recording Method

Hereinafter, an ink jet recording method and an ink jet recording apparatus preferably used in the invention will be described.

The ink jet recording method of the invention is a method in which the ink composition of the invention is ejected on a recording medium (support or recording material) to conduct ink jet recording, and active radiation rays are irradiated to the ink composition on the recording medium to cure the ink composition to form an image.

Specifically, the ink jet recording method of the invention includes: ejecting an ink composition of the invention on a recording medium to conduct ink jet recording (process (i-1)), and irradiating the ejected ink composition with an active radiation ray to cure the ink composition (process (i-2)) to form an image.

The ink jet recording method of the invention includes the above processes (i-1) and (i-2), whereby an image is formed on the recording medium by curing the ink composition on the recording medium.

An ink jet recording apparatus, which will be described below in detail, can be used in the process (i-1) of the ink jet recording method of the invention.

(Ink Jet Recording Apparatus)

There is no limit to the ink jet recording apparatus for use in the ink jet recording method of the invention. Any one of known ink jet recording apparatuses that provide images with desired resolution may be selected and used as such. That is, any one of known ink jet recording apparatuses including commercially available products may be used to eject an ink on a recording medium in the process (i-1) of the ink jet recording method of the invention.

The ink jet recording apparatus for use in the invention has, for example, an ink-supplying system, a temperature sensor, and an active radiation ray source. The ink-supplying system has, for example, a stock tank that stores the ink composition of the invention, supply pipes, an ink-supplying tank immediately before an ink jet head, a filter, and a piezoelectric ink jet head. Preferably, the piezoelectric ink jet head is designed according to multi size dot technology and can be so driven as to eject ink droplets having volumes of 1 to 100 pl, preferably 8 to 30 pl, at a definition of, for example, 320×320 to 4,000× 4,000 dpi, preferably 400×400 to 1,600×1,600 dpi, and more preferably 720×720 dpi. The term "dpi" as used herein means the number of dots aligned per 2.54 cm.

As described above, the radiation-curable ink, such as the ink composition of the invention, can be preferably heated at a constant temperature before the ejection. Therefore, thermal insulation and heating can be conducted in a region from the ink-supplying tank to the ink jet head. There is no particular limit to a method of controlling the temperature. For example, temperature sensors are preferably disposed in each of the pipes, so that heating can be controlled according to the flow of ink and environmental temperature. Some temperature sensors may be placed close to the ink-supplying tank and the ink jet head nozzle, respectively. Preferably, the ink jet head, which is used to heat the ink, has a main body that is thermally insulated in order to prevent outside air from affecting the temperature of the head. To shorten rise time necessary to heat the above region to a predetermined temperature or reduce loss in heat energy, it is preferable to thermally insulate the ink jet head from other units and reduce the heat capacity of the entire of a heating unit.

The ink composition of the invention is ejected onto the surface of a hydrophilic support using the ink jet recording apparatus as described above. At this time, it is preferable that the ink composition is heated to 40 to 80° C., and more preferably 25 to 50° C. to lower the viscosity of the ink composition to 7 to 30 mPa·s, and more preferably 7 to 25 mPa·s before the ejection. The ink composition preferably has a viscosity of 35 to 500 mPa·s at 25° C. to obtain significant effects. In this case, it is possible to realize high ejection stability. Generally, radiation-curable ink compositions, such as the ink composition of the invention, are more viscous than aqueous inks used as conventional ink jet recording inks. Therefore, fluctuation in temperature during ejection causes the viscosity of the radiation-curable ink compositions to significantly change. The fluctuation in the viscosity of the ink composition gives significant influence on the size of droplets and droplet ejection speed, causing deterioration in image quality. Thus, it is necessary to keep the temperature of the ink composition as constant as possible during ejection. The difference between the real temperature of the ink composition and the set temperature of the ink composition is preferably within ±5° C., more preferably ±2° C., and still more preferably ±1° C.

The process (i-2) of irradiating the ejected ink composition with an active radiation ray to cure the ink composition will be described below.

The ink composition deposited on the recording medium is cured by irradiating the ink composition with an active radiation ray. This is because the polymerization initiator (A) contained in the ink composition of the invention is decomposed by irradiation of the active radiation ray to generate initiation species such as radicals, acid, or base, which initiates and accelerates polymerization reaction of the specific polymerizable compound (B) and if any, other polymerizable compounds (D), and causes the ink composition to cure. When the ink composition contains a sensitizing dye (E) as well as the polymerization initiator (A), the sensitizing dye (E) in the ink composition absorbs the active radiation ray and thereby becomes an excited state. When the excited sensitizing dye comes into contact with the polymerization initiator (A), the sensitizing dye accelerates decomposition of the polymerization initiator (A) to allow progress of highly sensitive curing reaction.

Here, examples of the active radiation ray includes α-ray, γ-ray, electron beams, X-ray, ultraviolet rays, visible light and infrared light, and among these, any of electron beams, ultraviolet rays, and visible light is preferred. A desired peak wavelength for the active radiation ray depends on the absorption property of the sensitizing dye, if any. However, the peak wavelength of the active radiation ray is preferably 200 to 600 nm, more preferably 300 to 450 nm, and still more preferably 350 to 420 nm.

The polymerization initiator in the ink composition of the invention is sufficiently sensitive to radiation rays even at low output. Thus, the output of the radiation rays is preferably 2,000 mJ/cm$^2$ or less, more preferably 10 to 2,000 mJ/cm$^2$, still more preferably 20 to 1,000 mJ/cm$^2$, and most preferably 50 to 800 mJ/cm$^2$. The illuminance of the active radiation rays at an exposed surface is desirably 10 to 2,000 mW/cm$^2$, and preferably 20 to 1,000 mW/cm$^2$.

A mercury lamp, or a gas- or solid-state laser is mainly used as the active radiation ray source, and a mercury lamp or metal halide lamp is widely known as the light source to cure a UV-curable ink for ink jet recording. However, there is a strong need for mercury-free devices from the viewpoint of environmental protection. Substitution thereof with a GaN semiconductor ultraviolet ray-emitting device is very useful from the industrial and environmental standpoints. In addition, LED's (UV-LEDs) and LD's (UV-LDs), which have a small size, a long lifetime, a high efficiency and low costs, are attracting attention as light sources for radiation-curing ink jet printers.

A light-emitting diode (LED) or a laser diode (LD) may be used as the active radiation ray source. In particular, an ultraviolet LED or an ultraviolet LD may be used if an ultraviolet ray source is needed. For example, a purple LED emitting light with a main peak wavelength within the range of 365 to 420 nm is available from Nichia Corporation. If light having a still shorter wavelength is needed, U.S. Pat. No. 6,084,250 discloses an LED that can emit radiation rays having a central wavelength within the range of 300 to 370 nm. Other ultraviolet LEDs are also commercially available. Radiation rays having different ultraviolet ray bands may be irradiated. The radiation ray source in the invention is preferably a UV-LED, and more preferably a UV-LED having a peak wavelength within the range of 350 to 420 nm.

The maximum illuminance of LED on a recording medium is preferably 10 to 2,000 mW/cm$^2$, more preferably 20 to 1,000 mW/cm$^2$, and still more preferably 50 to 800 mJ/cm$^2$.

The time during which the ink composition of the invention is exposed to the active radiation ray is preferably 0.01 to 120 seconds, and more preferably 0.1 to 90 seconds.

Irradiation conditions and a basic method of irradiating active radiation ray are disclosed in JP-A No. 60-132767. Specifically, the active radiation ray is irradiated in a so-called shuttle manner in which a head unit having an ink-ejecting element, and light sources placed at both sides of the head unit are driven. The irradiation of the active radiation ray starts when a specific period of time (e.g., 0.01 to 0.5 seconds, preferably 0.01 to 0.3 seconds, and more preferably 0.01 to 0.15 seconds) has lapsed since deposit of the ink on a recording medium. Extremely shortening a time starting at the ink deposition and ending at the start of the irradiation makes it possible to prevent bleeding of the ink deposited on the recording medium before curing. Even when the recording medium is porous, it is possible to irradiate the ink before the ink penetrating into a portion of the recording medium which portion the irradiated rays cannot reach, in this case. Thus, the amount of unreacted residual monomer can be reduced, and odor can be consequently reduced. Alternatively, the ink may be completely cured with a fixed light source separated from the head unit. WO 99/54415 discloses an irradiation method in which an optical fiber is used and a method of irradiating recorded areas with UV rays that are collimated and reflected by a mirror placed on the side face of the head unit. These curing methods may also be applied to the recording method of the invention.

By employing the ink jet recording method described above, it becomes possible to deposit ink droplets having a diameter kept constant on the surfaces of various recording media having different surface wettabilities and to improve image quality. To obtain a multi-color image, images of respective colors are preferably formed one by one in the order of increasing luminosities. Formation of images in this manner allows the irradiated ray to reach the lowest ink layer, and good curing sensitivity, decreases in the amount of the residual monomer and odor, and improved adhesiveness may be obtained. Although images of respective colors may be simultaneously irradiated with active radiation ray, it is preferable to separately irradiate the images in order to accelerate curing.

In this way, the ink composition of the invention cures with high sensitivity by irradiation of active radiation ray and forms an image on a recording medium.

3. Planographic Printing Plate and Production Method Thereof

A planographic printing plate can be produced by applying the ink composition of the invention to a hydrophilic support in accordance with the ink jet recording method of the invention and curing the ink composition.

Hereinbelow, the method for producing a planographic printing plate by using the ink jet recording method of the invention (method for producing a planographic printing plate of the invention), and a planographic printing plate obtained therefrom (the planographic printing plate of the invention) will be described.

The planographic printing plate of the invention has a hydrophilic support and a hydrophobic image on the hydrophilic support. A method for producing the planographic printing plate includes: a process (ii-1) of ejecting the ink composition of the invention on a hydrophilic support, and a process (ii-2) of irradiating the ink composition with an active radiation ray to cure the ink composition to form a hydrophobic region of the cured ink composition on the hydrophilic support.

Specifically, a planographic printing plate can be produced by a method that is the same as the ink jet recording method of the invention except that the recording medium is a support having a hydrophilic surface and preferably used as a support for a planographic printing plate.

As described previously, the planographic printing plates have been produced by image-wise exposing a so-called PS plate having an oleophilic photosensitive resin layer on a hydrophilic support to light to solubilize or cure exposed regions to form a latent image, and dissolving and removing non-image regions. On the other hand, a planographic printing plate can be easily prepared by applying the method for producing the planographic printing plate of the invention (the ink jet recording method of the invention) to the production method thereof, namely by ejecting an ink composition directly on the surface of a hydrophilic support according to digitized image information, and curing the ink composition to form a hydrophobic image portion. Thus, it is possible to produce the planographic printing plate more easily, as compared with the prior art.

<Hydrophilic Support for Planographic Printing Plate>

The planographic printing plate of the invention has a hydrophilic support and a hydrophobic region (hydrophobic image) disposed on the support and obtained by ink composition of the invention, as aforementioned.

The support for a planographic printing plate (recording medium) to which the ink composition of the invention is ejected is a plate with stable dimensions and otherwise there is no particular limit thereto. However, the support preferably has a hydrophilic surface to obtain printed matters with high image quality. The material used for the support can be used as it is if it has hydrophilicity, or the surface thereof can be subject to immersion treatment if it does not have hydrophilicity. Examples of the material used for the support include paper, paper on which at least one plastic material (e.g., polyethylene, polypropylene, or polystyrene) is laminated, plates of metal (e.g., aluminum, zinc or copper), films of plastic (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal), and paper and plastic films on which at least one of those metals is laminated or deposited. The support is preferably a polyester film or an aluminum plate. Above all, the support is more preferably an aluminum plate because of good dimensional stability and relative inexpensiveness.

The aluminum plate is preferably a pure aluminum plate or an alloy plate containing aluminum as the main component and a trace amount of other elements, or a composite plate in which at least one plastic film is laminated on an aluminum film. Examples of elements other than aluminum and contained in the aluminum alloy include silicon, iron, manganese, copper, magnesium, chromium, zinc, bismuth, nickel, and titanium. The content of these elements in the alloy is preferably 10% by mass or less. Although the support is most preferably a pure aluminum plate, it is difficult to refine and prepare completely pure aluminum. Therefore, the support may contain a trace amount of elements other than aluminum. There is no limit to the composition of the aluminum plate, and any one of known aluminum plates may be used as the support. The thickness of the aluminum plate is preferably 0.1 mm to 0.6 mm, and more preferably 0.15 mm to 0.4 mm.

The aluminum plate is preferably subjected to surface treatment such as surface-roughening treatment or anodizing treatment before an image is formed on the aluminum plate. Hydrophilicity of the support and adhesion between an image recording layer and the support can be improved by the surface treatment. Before the surface-roughening treatment, the aluminum plate is degreased with, for example, a surfactant, an organic solvent, or an aqueous alkaline solution to remove a rolling oil on the surface thereof, if necessary.

Various methods may be used for surface roughening of the aluminum plate. Examples thereof include mechanical surface-roughening treatment, electrochemical surface-roughening treatment (surface-roughening by dissolving the surface of the aluminum plate electrochemically), and chemical surface-roughening treatment (surface-roughening by dissolving the surface selectively and chemically). Any one of known methods such as a ball polishing method, a brush polishing method, a blast polishing method, and a buff polishing method may be used in the mechanical surface-roughening treatment. Alternatively, a method in which the surface is provided with unevenness by a roll having an uneven surface during rolling of aluminum may be used. The electrochemical surface-roughening may be performed by, for example, applying an alternate or direct current to the support in an electrolytic solution containing acid such as hydrochloric acid or nitric acid. The acid may also be a mixed acid described in JP-A No. 54-63902. The aluminum plate after surface-roughening treatment may be alkali-etched with an aqueous solution containing, for example, potassium hydroxide or sodium hydroxide, neutralized, and to improve the abrasion resistance of the support, anodized, if necessary.

At least one electrolyte is used in the anodizing and any of electrolytes that form a porous oxide film may be used as such. The electrolyte used in the anodizing is generally sulfuric acid, hydrochloric acid, oxalic acid, chromic acid, or a mixed acid thereof. A desired concentration for the electrolyte depends on the kind of the electrolyte. The conditions of the anodizing depend on the type of the electrolyte used, and are not clearly defined. However, generally, the concentration of the electrolyte(s) is preferably 1 to 80% by mass, and the temperature of the electrolytic solution is preferably 5 to 70° C., and the density of electric current is preferably 5 to 60 $A/dm^2$, and the voltage is preferably 1 to 100 V, and the electrolysis time is preferably 10 seconds to 5 minutes. The amount of the anodic oxide film formed is preferably 1.0 to 5.0 $g/m^2$, and more preferably 1.5 to 4.0 $g/m^2$. When the anodic oxide film has a coating amount within the above range, the support for a planographic printing plate has good printing durability and good scratch resistance.

As the support used in the invention, the support having the above-treated surface and having thereon the anodic oxide film described above may be used as it is. However, the support may be subjected to further treatment, such as treatment for expanding or sealing micropores of the anodic oxide film described in JP-A Nos. 2001-253181 and 2001-322365, or surface-hydrophilizing treatment that includes immersing the support in an aqueous solution containing at least one hydrophilic compound, in order to improve adhesion with the hydrophobic image, hydrophilicity, staining resistance, or the like, if necessary. The micropore expanding and sealing are not limited to the methods described above, and any one of known methods may be used as such.

(Micropore Sealing)

The micropore sealing may be performed with vapor, fluorozirconic acid alone, an aqueous solution containing at least one inorganic fluorine compound such as sodium fluoride, vapor including lithium chloride, or hot water. Among these, the micropore sealing is preferably conducted with an aqueous solution containing at least one inorganic fluorine compound, steam, or hot water. Each of these will be described below.

Micropore Sealing with Aqueous Solution Containing Inorganic Fluorine Compound

The inorganic fluorine compound contained in the aqueous solution used in the micropore sealing is preferably metal fluoride. Examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, fluorozirconic acid, fluorotitanic acid, hexafluorosilicic acid, nickel fluoride, iron fluoride, fluorophosphoric acid, and ammonium fluorophosphate.

Among them, the inorganic fluorine compound is preferably sodium fluorozirconate, sodium fluorotitanate, fluorozirconic acid, or fluorotitanic acid.

The concentration of the inorganic fluorine compound(s) in the aqueous solution is preferably 0.01% by mass or higher, and more preferably 0.05% by mass or higher to sufficiently seal micropores of the anodic oxide film. Moreover, the concentration of the inorganic fluorine compound(s) in the aqueous solution is preferably 1% by mass or lower, and more preferably 0.5% by mass or lower in view of stain resistance. Preferably, the aqueous solution containing at least one inorganic fluorine compound further contains at least one phosphate compound. When the phosphate compound is contained in the aqueous solution, the hydrophilicity of the surface of the anodic oxide film is improved, improving developability in a printing apparatus and stain resistance.

The phosphate compound is preferably selected from metal phosphates such as phosphates of alkali metals and phosphates of alkaline earth metals.

Specific examples thereof include zinc phosphate, aluminum phosphate, ammonium phosphate, diammonium hydrogen phosphate, ammonium dihydrogen phosphate, monoammonium phosphate, monopotassium phosphate, monosodium phosphate, potassium dihydrogen phosphate, dipotassium hydrogen phosphate, calcium phosphate, sodium ammonium hydrogen phosphate, magnesium hydrogen phosphate, magnesium phosphate, ferrous phosphate, ferric phosphate, sodium dihydrogen phosphate, sodium phosphate, disodium hydrogen phosphate, lead phosphate, diammonium phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, the phosphate compound is preferably sodium dihydrogen phosphate, disodium hydrogen phosphate, potassium dihydrogen phosphate or dipotassium hydrogen phosphate.

There is no particular limit to a combination of the inorganic fluorine compound(s) and the phosphate compound(s). Preferably, the aqueous solution contains sodium fluorozirconate as the inorganic fluorine compound and sodium dihydrogen phosphate as the phosphate compound.

The concentration of the phosphate compound(s) in the aqueous solution is preferably 0.01% by mass or higher, and more preferably 0.1% by mass or higher to improve developability in a printing apparatus and stain resistance. The concentration of the phosphate compound(s) in the aqueous solution is preferably 20% by mass or lower, and more preferably 5% by mass or lower in terms of solubility of the phosphate compound.

There is no particular limit to the rate of each of the compounds in the aqueous solution. The weight ratio of the inorganic fluorine compound(s) to the phosphate compound(s) is preferably in the range of 1/200 to 10/1, and more preferably in the range of 1/30 to 2/1.

The temperature of the aqueous solution is preferably 20° C. or higher, and more preferably 40° C. or higher, but preferably 100° C. or lower, and more preferably 80° C. or lower.

The pH of the aqueous solution is preferably 1 or higher, and more preferably 2 or higher, but preferably 11 or lower, and more preferably 5 or lower.

There is no particular limit to a method of sealing micropores with the aqueous solution containing at least one inorganic fluorine compound. The method can be an immersion method or a spraying method. One of these methods can be conducted alone, or two or more of them may be used together. Each sealing treatment may be conducted only once, or may be conducted twice or more. The sealing treatment is preferably conducted by an immersion method. When an immersion method is used in the treatment, the treatment time is preferably at least 1 second, and more preferably at least 3 seconds, but preferably 100 seconds or shorter, and more preferably 20 seconds or shorter.

Sealing with Steam

The sealing with steam may be conducted by, for example, continuously or intermittently bringing the anodic oxide film into contact with pressurized steam or steam of normal pressure. The temperature of the steam is preferably 80° C. or higher, and more preferably 95° C. or higher, but preferably 105° C. or lower. The pressure of the steam is preferably in the range of a value obtained by subtracting 50 mmAq from atmospheric pressure to a value obtained by adding 300 mmAq to atmospheric pressure. Specifically, the pressure of the steam is preferably in the range of $1.008 \times 10^5$ to $1.043 \times 10^5$ Pa. The duration during which the anodic oxide film is brought into contact with steam is preferably 1 second or longer, and more preferably 3 seconds or longer, but preferably 100 seconds or shorter, and more preferably 20 seconds or shorter.

Sealing with Hot Water

The sealing with hot water (steam) may be conducted by, for example, immersing the aluminum plate having an anodic oxide film thereon in hot water. The hot water may contain at least one inorganic salt (for example, a phosphate) or an organic salt. The temperature of the hot water is preferably 80° C. or higher, and more preferably 95° C. or higher, but preferably 100° C. or lower. The immersion time is preferably 1 second or longer, and more preferably 3 seconds or longer, but preferably 100 seconds or shorter, and more preferably 20 seconds or shorter.

The hydrophilizing may be conducted by an alkali metal silicate method such as those disclosed in U.S. Pat. Nos. 2,714,066, 3,181,461, 3,280,734, and 3,902,734. In the method, a support is immersed or electrolyzed in an aqueous solution of sodium silicate. Alternatively, the hydrophilizing can be performed by a method disclosed in JP-B No. 36-22063. In the method, a support is processed with potassium fluorozirconate. The hydrophilizing may also be conducted by a method such as those disclosed in U.S. Pat. Nos. 3,276,868, 4,153,461, and 4,689,272. In the method, a support is processed with polyvinyl phosphonic acid.

The support of the invention preferably has a center-line average roughness of 0.10 to 1.2 μm. The support whose center-line average roughness is within the above range has good adhesiveness to an image-recording layer, good printing durability, and good staining resistance.

(ii-1) Ejecting Ink Composition onto Hydrophilic Support

First, the ink composition of the invention is ejected on a hydrophilic support. In this process, as in the process (i-1) of the ink jet recording method, a conventionally known ink jet recording apparatus can be used. Here, the preferable ranges of the temperature and the viscosity of the ink, and the regulation methods thereof are the same as in the aforementioned ink used in the ink jet recording apparatus. The amount of the ejected ink in the process (i-1), the size of the liquid droplet, and the like are appropriately selected according to the printed material to be formed.

(ii-2) Irradiating Ink Composition with Active Radiation Rays to Form Hydrophobic Region The ink composition ejected on the hydrophilic support is irradiated with active radiation rays to cure the ink composition. The details of the curing mechanism are the same as in the process (i-2) of the aforementioned ink jet recording method. The active radiation ray source and the preferred irradiation conditions that are used in the ink curing are the same as in the aforementioned ink jet recording method.

By conducting the above-described process, a planographic printing plate can be obtained by forming a hydrophobic image produced by curing the ink composition of the invention on a hydrophilic support.

As such, by producing a planographic printing plate using the ink jet recording method of the invention, it is possible to deposit dots having a constant diameter on various supports for planographic printing plates that are different in surface wettability, thus improving the precision of the resultant hydrophobic image.

As described above, the ink composition of the invention can be cured with high sensitivity by irradiation with active radiation rays to form a hydrophobic region (or hydrophobic image) having good adhesiveness to a support and good physical properties.

Accordingly, the planographic printing plate of the invention has high image quality and good printing durability. Further, the ink composition of the invention is useful not only in forming the image region(s) of planographic printing plates, but also as an ordinary ink composition applied in the preparation of printed materials, etc.

As mentioned above, according to the invention, the ink composition of the invention can be cured with high sensitivity by irradiation of an active radiation ray to form an image having high image quality, and thus, an ink composition having improved image flexibility after curing the ink, and high adhesiveness with a recording medium can be provided, and an ink jet recording method using the ink composition can also be provided. Moreover, according to the invention, a planographic printing plate obtained by using an ink composition which can be cured with high sensitivity by irradiation of active radiation rays such as ultra violet rays, as well as a method for producing the planographic printing plate can be provided.

EXAMPLES

Hereinafter, the invention will be described more specifically, while referring to Examples. However, it should be understood that the invention is not limited to these Examples. The following Examples relate to UV ink jet inks having various colors. The term "part" means part by mass, unless otherwise indicated.

Example 1

The following components were blended with a high-speed water cooling-type stirrer to prepare a cyan UV ink composition for ink jet recording.
(Cyan Ink Composition)
Specific polymerizable compound [Exemplary compound (B-7): Component (B)]: 25.0 parts
Tridecyl acrylate (SR498E manufactured by Sartomer Company, Inc.): 11.0 parts
2-Phenoxyethylacrylate (SR339 manufactured by Sartomer Company, Inc.): 23.4 parts
Trimethylolpropane triacrylate [component (D)] (SR351 manufactured by Sartomer Company, Inc.): 8.0 parts
Solsperse 32000 (dispersant manufactured by Noveon): 0.4 parts
Irgalite Blue GLVO [component (C)] (pigment manufactured by Ciba Specialty Chemicals): 3.6 parts
Genorad 16 (polymerization inhibitor manufactured by Rahn): 0.05 parts
Rapi-Cure DVE-3 (vinyl ether compound manufactured by ISP Europe): 4.0 parts
Lucirin TPO (photopolymerization initiator manufactured by BASF: component (A)): 8.5 parts
Benzophenone (photopolymerization initiator: component (A)): 4.0 parts
Irgacure 184 (photopolymerization initiator manufactured by Ciba Specialty Chemicals: component (A)): 4.0 parts
Byk 307 (antifoamer manufactured by BYK Chemie): 0.05 parts
(Evaluation of Ink)

By using the obtained cyan ink composition and an ink jet recording apparatus having a piezo ink jet head (CA3 (manufactured by Toshiba Tec Corporation), recording was performed on a sheet made of polvinyl chloride. The ink supply system consisted of a reservoir tank, a supply pipe, an ink supply tank in front of the ink jet head, a filter, and a piezo ink jet head, and the temperature of the nozzle part was controlled to remain at 45° C.±3° C. (a 100% coated image was printed). After the ink composition was ejected, the ink was cured by passing the sheet at a speed of 40 m/min under light irradiation by an iron-doped ultraviolet lamp (power 120 W/cm$^2$) to obtain printed matter. The following evaluation was carried out at this time.
<Curing Sensitivity>

The exposure energy at the time of curing was measured by a light quantity accumulation meter (UV PowerMAP, manufactured by EIT). A smaller value indicates a higher curing sensitivity. In the results for the ink composition of Example 1, the integrated light exposure quantity of UV rays on the sheet was about 330 mJ/cm$^2$, indicating that the curing occurred with a high sensitivity.
<Curability>

The curability was evaluated through examination by touching the image part of the printed matter obtained using the ink, after curing it with the integrated light exposure quantity of UV rays on the sheet of about 330 mJ/cm$^2$. The curability was evaluated on the basis of the presence of stickiness of the surface of the cured film. The results showed that stickiness completely disappeared after curing, indicating that the curability was excellent.
<Adhesiveness to Recording Medium>

The adhesiveness to the recording medium was evaluated according to a cross-hatch test (EN ISO2409), and expressed by the levels 5B through 1B, in accordance with the standard by the ASTM test method, in which 5B indicates the highest adhesiveness and 3B or more indicates levels which are acceptable in practice. As a result, the ink composition of Example 1 had high adhesiveness, attaining level 4B by the ASTM test method.
<Flexibility>

The flexibility of the image was evaluated by folding the sheet obtained by image formation using ink ten times and checking the degree of cracks, if any, of the image. Results of this folding test were evaluated on a scale of 1 to 5. Grade 5 indicates that no cracks occurred, and grades 3 to 5 indicate that the flexibility is acceptable in practice. The results show that the sheet of Example 1 subjected to the folding test had slight cracks that did not adversely affect the printed image, and was ranked as grade 4.

Example 2

The following components were blended with a high-speed water cooling-type stirrer to prepare a magenta UV ink composition for ink jet recording.

(Magenta Ink Composition)
  Specific polymerizable compound [Exemplary compound (B-8): component (B)]: 13.0 parts
  N-vinyl caprolactam [component (D)]: 27.0 parts
  2-Phenoxyethylacrylate (SR339 manufactured by Sartomer Company, Inc.): 21.4 parts
  Trimethylolpropane triacrylate [component (D)] (SR351 manufactured by Sartomer Company, Inc.): 5.0 parts
  Solsperse 32000 (dispersant manufactured by Noveon): 0.4 parts
  Cinquasia Mazenta RT-355D [component (C)] (pigment manufactured by Ciba Specialty Chemicals): 3.6 parts
  Genorad 16 (polymerization inhibitor manufactured by Rahn): 0.05 parts
  Rapi-Cure DVE-3 (vinyl ether compound manufactured by ISP Europe): 4.0 parts
  Lucirin TPO (photopolymerization initiator manufactured by BASF: component (A)): 8.5 parts
  Benzophenone (photopolymerization initiator: component (A)): 4.0 parts
  Irgacure 184 (photopolymerization initiator manufactured by Ciba Specialty Chemicals: component (A)): 4.0 parts
  Isopropylthioxanthone (ITX): 1.0 parts
  Byk 307 (antifoamer manufactured by BYK Chemie): 0.05 parts The obtained magenta ink was ejected onto a sheet made of polyvinyl chloride and then cured in the same manner as in Example 1. The resultant printed matter obtained using the ink was evaluated in the same manner as in Example 1. The results are shown in Table 1.

Example 3

The following components were blended with a high-speed water cooling-type stirrer to prepare a yellow UV ink composition for ink jet recording.
(Yellow Ink Composition)
  Specific polymerizable compound [Exemplary compound (B-8): component (B)]: 4.0 parts
  Specific polymerizable compound [Exemplary compound (B-24): component (B)]: 18.0 parts
  N-vinyl caprolactam [component (D)]: 21.0 parts
  2-Phenoxyethylacrylate (SR339 manufactured by Sartomer Company, Inc.): 20.4 parts
  Trimethylolpropane triacrylate [component (D)] (SR351 manufactured by Sartomer Company, Inc.): 4.0 parts
  Dipropylene glycol diacrylate [component (D)] (SR508 manufactured by Sartomer Company, Inc.): 1.0 parts
  Solsperse 32000 (dispersant manufactured by Noveon): 0.4 parts
  Cromophtal Yellow LA component (C) (pigment manufactured by Ciba Specialty Chemicals): 3.6 parts
  Genorad 16 (polymerization inhibitor manufactured by Rahn): 0.05 parts
  Rapi-Cure DVE-3 (vinyl ether compound manufactured by ISP Europe): 2.0 parts
  Lucirin TPO (photopolymerization initiator manufactured by BASF: component (A)): 8.5 parts
  Benzophenone (photopolymerization initiator: component (A)): 4.0 parts
  Irgacure 184 (photopolymerization initiator manufactured by Ciba Specialty Chemicals: component (A)): 4.0 parts
  Isopropylthioxanthone (ITX): 1.0 parts
  Byk 307 (antifoamer manufactured by BYK Chemie): 0.05 parts The obtained yellow ink was ejected onto a sheet made of polyvinyl chloride and then cured in the same manner as in Example 1. The resultant printed matter obtained using the ink was evaluated in the same manner as in Example 1. The results are shown in Table 1.

Example 4

The following components were blended with a high-speed water cooling-type stirrer to prepare a black UV ink composition for ink jet recording.
(Black Ink Composition)
  Specific polymerizable compound [Exemplary compound (B-20): component (B)]: 20.0 parts
  Isobornyl acrylate [component (D)] (SR506D manufactured by Sartomer Company, Inc.): 17.0 parts
  2-Phenoxyethyl acrylate [component (D)] (SR339 manufactured by Sartomer Company, Inc.): 28.4 parts
  Trimethylolpropane triacrylate [component (D)] (SR351 manufactured by Sartomer Company, Inc.): 6.0 parts
  Solsperse 32000 (dispersant manufactured by Noveon): 0.4 parts
  Microlith Black C-K [component (C)] (pigment manufactured by Ciba Specialty Chemicals): 2.6 parts
  Genorad 16 (polymerization inhibitor manufactured by Rahn): 0.05 parts
  Lucirin TPO (photopolymerization initiator manufactured by BASF: component (A)): 8.5 parts
  Benzophenone (photopolymerization initiator: component (A)): 4.0 parts
  Irgacure 184 (photopolymerization initiator manufactured by Ciba Specialty Chemicals: component (A)): 4.0 parts
  Isopropylthioxanthone (ITX): 1.0 parts
  Byk 307 (antifoamer manufactured by BYK Chemie): 0.05 parts The obtained black ink was ejected onto a sheet made of polyvinyl chloride and then cured in the same manner as in Example 1. The resultant printed matter obtained using the ink was evaluated in the same manner as in Example 1. The results are shown in Table 1.

Example 5

The following components were blended with a high-speed water cooling-type stirrer to prepare a cyan UV ink composition for ink jet recording.
(Cyan Ink Composition)
  Specific polymerizable compound [Exemplary compound (B-25): component (B)]: 26.0 parts
  N-vinyl caprolactam [component (D)]: 24.0 parts
  2-Phenoxyethylacrylate (SR339 manufactured by Sartomer Company, Inc.): 14.4 parts
  Trimethylolpropane triacrylate [component (D)] (SR351 manufactured by Sartomer Company, Inc.): 2.0 parts
  Dipropylene glycol diacrylate [component (D)] (SR508 manufactured by Sartomer Company, Inc.): 2.0 parts
  Solsperse 32000 (dispersant manufactured by Noveon): 0.4 parts
  Irgalite Blue GLVO [component (C)] (pigment manufactured by Ciba Specialty Chemicals): 3.6 parts
  Genorad 16 (polymerization inhibitor manufactured by Rahn): 0.05 parts
  Rapi-Cure DVE-3 (vinyl ether compound manufactured by ISP Europe): 2.0 parts
  Lucirin TPO (photopolymerization initiator manufactured by BASF: component (A)): 8.5 parts
  Benzophenone (photopolymerization initiator: component (A)): 4.0 parts Irgacure 184 (photopolymerization initiator manufactured by Ciba Specialty Chemicals: component (A)): 4.0 parts
Isopropylthioxanthone (ITX): 1.0 parts
Byk 307 (antifoamer manufactured by BYK Chemie): 0.05 parts The obtained cyan ink was ejected onto a sheet made of polyvinyl chloride and then cured in the same manner as in Example 1. The resultant printed matter obtained using the ink was evaluated in the same manner as in Example 1. The results are shown in Table 1.

Comparative Example 1

The following components were blended with a high-speed water cooling-type stirrer to prepare a cyan UV ink composition for ink jet recording.
(Cyan Ink Composition)
Undecyl acrylate [the following compound: component (D)]: 25.0 parts

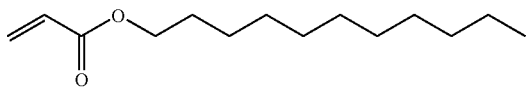

Undecyl acrylate

Tridecylacrylate [component (D)] (SR498E manufactured by Sartomer Company, Inc.): 11.0 parts
2-Phenoxyethylacrylate [component (D)] (SR339 manufactured by Sartomer Company, Inc.): 23.4 parts
Trimethylolpropane triacrylate [component (D)] (SR351 manufactured by Sartomer Company, Inc.): 8.0 parts
Solsperse 32000 (dispersant manufactured by Noveon): 0.4 parts
Irgalite Blue GLVO [component (C)] (pigment manufactured by Ciba Specialty Chemicals): 3.6 parts
Genorad 16 (polymerization inhibitor manufactured by Rahn): 0.05 parts
Rapi-Cure DVE-3 (vinyl ether compound manufactured by ISP Europe): 4.0 parts
Lucirin TPO (photopolymerization initiator manufactured by BASF: component (A)): 8.5 parts
Benzophenone (photopolymerization initiator: component (A)): 4.0 parts
Irgacure 184 (photopolymerization initiator manufactured by Ciba Specialty Chemicals): component (A)): 4.0 parts
Byk 307 (antifoamer manufactured by BYK Chemie): 0.05 parts The obtained cyan ink was ejected onto a sheet made of polyvinyl chloride and then cured in the same manner as in Example 1. The resultant printed matter obtained using the ink was evaluated in the same manner as in Example 1. The results are shown in Table 1.

Comparative Example 2

The following components were blended with a high-speed water cooling-type stirrer to prepare a cyan UV ink composition for ink jet recording.
(Cyan Ink Composition)
Tridecylacrylate [component (D)] (SR498E manufactured by Sartomer Company, Inc.): 11.0 parts
2-Phenoxyethylacrylate [component (D)] (SR339 manufactured by Sartomer Company, Inc.): 23.4 parts
Trimethylolpropane triacrylate [component (D)] (SR351 manufactured by Sartomer Company, Inc.): 33.0 parts
Solsperse 32000 (dispersant manufactured by Noveon): 0.4 parts
Irgalite Blue GLVO [component (C)] (pigment manufactured by Ciba Specialty Chemicals): 3.6 parts
Genorad 16 (polymerization inhibitor manufactured by Rahn): 0.05 parts
Rapi-Cure DVE-3 (vinyl ether compound manufactured by ISP Europe): 4.0 parts
Lucirin TPO (photopolymerization initiator manufactured by BASF: component (A)): 8.5 parts
Benzophenone (photopolymerization initiator: component (A)): 4.0 parts
Irgacure 184 (photopolymerization initiator manufactured by Ciba Specialty Chemicals): component (A)): 4.0 parts
Byk 307 (antifoamer manufactured by BYK Chemie): 0.05 parts The obtained cyan ink was ejected onto a sheet made of polyvinyl chloride and then cured in the same manner as in Example 1. The resultant printed matter obtained using the ink was evaluated in the same manner as in Example 1. The results are shown in Table 1.

TABLE 1

| | Curing sensitivity, integrated light exposure quantity (mJ/cm$^2$) | Adhesiveness | Flexibility |
|---|---|---|---|
| Example 1 | Good | 3B | 4 |
| Example 2 | Good | 4B | 5 |
| Example 3 | Good | 5B | 5 |
| Example 4 | Good | 3B | 4 |
| Example 5 | Good | 5B | 5 |
| Comparative Example 1 | Not cured | — | — |
| Comparative Example 2 | Good | 2B | 1 |

As is apparent from Table 1, all of the ink compositions of Examples 1 to 5 were found to be curable with high sensitivity and excellent in all of curability of the image parts, adhesiveness to the recording medium, and flexibility of the formed image, indicating that the ink compositions would exhibit no problems in practice. Among these, the ink compositions of Examples 3 and 5 in which the compounds having ring structures were used as the specific polymerizable compounds (B), were excellent in adhesiveness and flexibility.

On the other hand, the ink composition of Comparative Example 1 in which undecyl acrylate was used instead of the specific polymerizable compound (B) (the Exemplary compound B-7) in the ink composition of Example 1, was not cured, and accordingly evaluation of a cured film could not be conducted. Further, the ink composition of Comparative Example 2 having the same composition as the ink composition of Example 1 except that the specific polymerizable compound (B) was not used, showed good curability, but poor adhesiveness and flexibility, indicating that it would be unacceptable in practice.

Example 6

Preparation of Support

Molten aluminum was prepared by melting an aluminum alloy containing 0.06 mass % of silicon, 0.30 mass % of iron, 0.025 mass % of copper, 0.001 mass % of manganese, 0.001 mass % of magnesium, 0.001 mass % of zinc, 0.03 mass % of titanium, a trace amount of unavoidable impurities, and the remaining of aluminum. The molten aluminum was filtered and molded into ingots having a thickness of 500 mm and a width of 1,200 mm by DC casting. The surface portion of the ingot which surface portion had an average depth of 10 mm was shaved off by a facing attachment, and the ingot was soaked at 550° C. for approximately 5 hours. After the ingot cooled to 400° C., the ingot was rolled into a rolled plate having a thickness of 2.7 mm with a hot rolling mill. The plate was heated at 500° C. with a continuous annealing machine and cold-rolled into an aluminum plate having a thickness of 0.24 mm, which satisfied the requirements prescribed in JIS 1050. As for the average size of the aluminum crystals in the aluminum plate, the minor and major axes were 50 μm and 300 μm, respectively. After a piece having a width of 1,030 mm was cut from the aluminum plate, the piece was subjected to the following surface treatment so as to prepare an aluminum support.

<Surface Treatment>

The aluminum support was continuously subjected to the following treatments (a) to (j). The processing solution remaining on the aluminum plate was removed by a nip roller, after each treatment and washing with water.

(a) Mechanical Surface Roughening Treatment

The aluminum plate was surface-roughened mechanically with revolving nylon brush rollers, while a polishing slurry containing an abrasive (pumice) having a specific gravity of 1.12 and water was supplied to the surface of the aluminum plate. The average diameter of the abrasive particles was 30 μm, and the maximum diameter was 100 μm. Each of the nylon brush rollers was made of 6,10 nylon, and had bristles whose length and diameter were 45 mm and 0.3 mm, respectively. Each of the nylon brush rollers was prepared by drilling a stainless steel tube having a diameter of 300 mm and densely bristling the stainless steel tube in the holes thereof. The number of the revolving nylon brush rollers was three. Two support rollers (diameter of 200 mm) were disposed below the brush rollers, with the distance therebetween being 300 mm. The brush rollers were pressed against the aluminum plate so that the load of a drive motor that rotated the brush rollers during the pressing was 7 kW heavier than that before the roller was pressed. The rotation direction of the brush rollers was the same as the traveling direction of the aluminum plate. The rotational frequency of the brush rollers was 200 rpm.

(b) Alkaline Etching Treatment

The aluminum plate thus obtained was etched by spraying it with an aqueous solution containing 2.6% by mass of caustic soda and 6.5% by mass of aluminum ions and kept at a temperature of 70° C. Thereby, the aluminum plate was dissolved so that the amount of dissolved aluminum was 10 g/m$^2$. The aluminum plate was then washed with water by spraying.

(c) Desmutting Treatment

The aluminum plate was desmutted by spraying it with an aqueous solution kept at a temperature of 30° C. and containing 1% by mass of nitric acid and 0.5% by mass of aluminum ions. The aluminum plate was then washed with water by spraying. The aqueous solution containing nitric acid used in the desmutting was the waste water discharged from the following process of electrochemical surface-roughening treatment using AC current in an aqueous nitric acid solution.

(d) Electrochemical Surface-Roughening Treatment

The aluminum plate was surface-roughened electrochemically, continuously, while AC voltage having a frequency of 60 Hz was used. The electrolytic solution used in this treatment was an aqueous solution containing 10.5 g/L of nitric acid, 5 g/L of aluminum ions and 0.007% by mass of ammonium ions, and the temperature of the electrolytic solution was 50° C. In the electrochemical surface-roughening treatment, an alternate current having trapezoidal, rectangular waves with a period, which was necessary to raise an electric current value from zero to the peak, of 0.8 msec and a duty ratio of 1:1 was used, and a carbon electrode was used as a counter electrode. A ferrite anode was used as an auxiliary anode. The electric current density was 30 A/dm$^2$ at a maximum current value. The total amount of electric current at the time that the aluminum plate was used as the anode was 220 C/dm$^2$. Part (5%) of the current from power source was supplied to the auxiliary electrode. Subsequently, the aluminum plate was washed with water by spraying.

(e) Alkaline Etching Treatment

The aluminum plate was etched by spraying it with an aqueous solution containing 26% by mass of caustic soda and 6.5% by mass of aluminum ions and kept at 32° C. Thereby, the aluminum plate was dissolved so that the amount of dissolved aluminum was 0.50 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(f) Desmutting Treatment

The aluminum plate was desmutted by spraying it with an aqueous solution kept at a temperature of 30° C. and containing 15% by mass of nitric acid and 4.5% by mass of aluminum ions. The aluminum plate was then washed with water by spraying. The aqueous solution containing nitric acid used in the desmutting was the waste water discharged from the aforementioned process of electrochemical surface-roughening treatment using AC current in an aqueous nitric acid solution.

(g) Electrochemical Surface-roughening Treatment)

The aluminum plate was surface-roughened electrochemically, continuously, while AC voltage having a frequency of 60 Hz was used. The electrolytic solution used in this treatment was an aqueous solution containing 5.0 g/L of hydrochloric acid and 5 g/L of aluminum ions, and the temperature of the electrolytic solution was 35° C. In the electrochemical surface-roughening treatment, an alternate current having trapezoidal, rectangular waves with a period, which was necessary to raise an electric current value from zero to the peak, of 0.8 msec and a duty ratio of 1:1 was used, and a carbon electrode was used as a counter electrode. A ferrite anode was used as an auxiliary anode. The electric current density was 25 A/dm$^2$ at a maximum current value. The total amount of electric current at the time that the aluminum plate was used as the anode was 50 C/dm$^2$. Subsequently, the aluminum plate was washed with water by spraying.

(h) Alkaline Etching Treatment

The aluminum plate was etched by spraying it with an aqueous solution containing 26% by mass of caustic soda and 6.5% by mass of aluminum ions and kept at 32° C. Thereby, the aluminum plate was dissolved so that the amount of dissolved aluminum was 0.12 g/m$^2$. Smuts including as the main component aluminum hydroxide and occurred in the electrochemical surface-roughening treatment using AC current were removed and the edge regions of the resultant pits were dissolved to smoothen the edge regions. Subsequently, the aluminum plate was washed with water by spraying.

(i) Desmutting Treatment

The aluminum plate was desmutted by spraying it with an aqueous solution kept at a temperature of 60° C. and containing 25% by mass of sulfuric acid and 0.5% by mass of aluminum ions. The aluminum plate was then washed with water by spraying.

(j) Anodizing Treatment

The aluminum plate was anodized with an anodic oxidation apparatus that included first and second electrolysis units each having a length of 6 m, first and second power supply units each having a length of 3 m, and first and second power supply units each having a length of 2.4 m. The electrolytic solution supplied to the first and second electrolysis units included sulfuric acid. More specifically, the electrolytic solution was an aqueous solution containing 50 g/L of sulfuric acid and 0.5% by mass of aluminum ions and kept at a temperature of 20° C. The aluminum plate was then washed with water by spraying. The amount of the oxide layer thus prepared was 2.7 g/m$^2$.

(Preparation and Evaluation of Planographic Printing Plate)

The ink composition of Example 1 was ejected onto the aluminum support thus prepared and the image was formed and cured in the same manner as in Example 1. Thus, a planographic printing plate was obtained therefrom, and evaluation of image and printing durability was conducted in the following manners.

<Evaluation of Image>

Ink [VALUES-G red for sheets (manufactured by Dainippon Ink and Chemicals, Inc.)] and dampening water [ECOLITY 2 (manufactured by Fuji Photo Film)] were applied to the planographic printing plate prepared by using the ink composition of Example 1, and the planographic printing plate was loaded in a HEIDEL KOR-D printing machine. An image was printed on 100 sheets of paper, and the image on the 100th sheet was evaluated visually. It was confirmed that the image had no missing portions in the image regions and no stains in the non-image regions.

<Evaluation of Printing Durability>

The image on the planographic printing plate was further printed on sheets of paper. 5,000 or more prints having no missing portions in image regions and no stains in non-image regions were obtained. This shows that the planographic printing plate had printing durability that would be acceptable in practice.

From the above results, it was found that the planographic printing plate on which an image is formed by using the ink composition of the invention has high image quality and good printing durability, and further the ink composition of the invention is preferably applied in the preparation of a planographic printing plate.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising (i) a polymerization initiator, (ii) a (meth)acrylate which includes a (meth)acryloyl group and an additional double bond having, at an α position, a carbon atom having an sp$^3$ hybrid orbital, (iii) an N-vinyllactam as another polymerizable compound other than the (meth)acrylate having a double bond with a carbon atom having an sp$^3$ hybrid orbital at an α position, and (iv) a colorant, wherein the (meth)acrylate is represented by following formula (I):

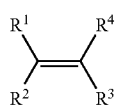

wherein R$^1$ to R$^4$ each independently represents a hydrogen atom or an alkyl group, all of R$^1$ to R$^4$ are not hydrogen atoms, and at least one alkyl group represented by R$^1$ to R$^4$ is bonded to an acrylate group represented by formula (II), or a methacrylate group represented by formula (III), directly or via a bivalent linking group:

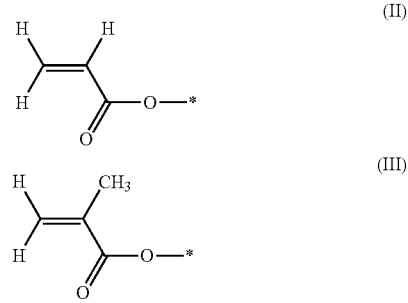

wherein in the formula (II) or (III), * represents a binding site for the alkyl group represented by any one of R$^1$ to R$^4$, or for a linkage bound to the alkyl group, wherein in the formula (I), two or more alkyl groups represented by R$^1$ to R$^4$ are not bonded to form a ring structure, the alkyl group represented by R$^1$, R$^2$, R$^3$, or R$^4$ has two or more carbon atoms, and the other three of R$^1$ to R$^4$ are selected from the group consisting of a hydrogen atom and a methyl group, and wherein the bivalent linking group in formula (I) is an alkylene group, or an alkylene group wherein a methylene group in the alkylene group is replaced with a divalent group selected from —O—, —S—, or —NR$_5$— wherein R$_5$ represents an alkyl group, and wherein the content of the colorant is from 1 to 10% by mass with respect to the total content of the ink composition.

2. The ink composition of claim 1, wherein, in the (meth)acrylate, the number of the double bonds with carbon atoms having sp$^3$ hybrid orbitals at α positions is 1 to 8.

3. The ink composition of claim 1, wherein the content of the (meth)acrylate having a double bond with a carbon atom having an sp$^3$ hybrid orbital at an α position is in the range of 3 to 45% by mass with respect to the total weight of the ink composition.

4. The ink composition of claim 1, wherein the colorant is a pigment.

5. The ink composition of claim 1, wherein the colorant is a dye.

6. The ink composition of claim 1, wherein the N-vinyllactam is N-vinylcaprolactam.

7. The ink composition of claim 1, wherein the polymerization initiator is a radical polymerization initiator.

8. The ink composition of claim 7, wherein the radical polymerization initiator comprises an acylphosphine compound.

9. The ink composition of claim 8, wherein the acylphosphine compound comprises diphenyl (2,4,6-trimethoxybenzoyl)phosphine oxide.

10. The ink composition of claim 1, wherein the (meth)acrylate is selected from the group consisting of compounds (B-1) to (B-20):

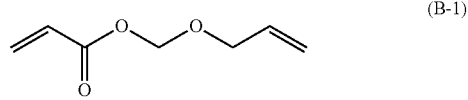

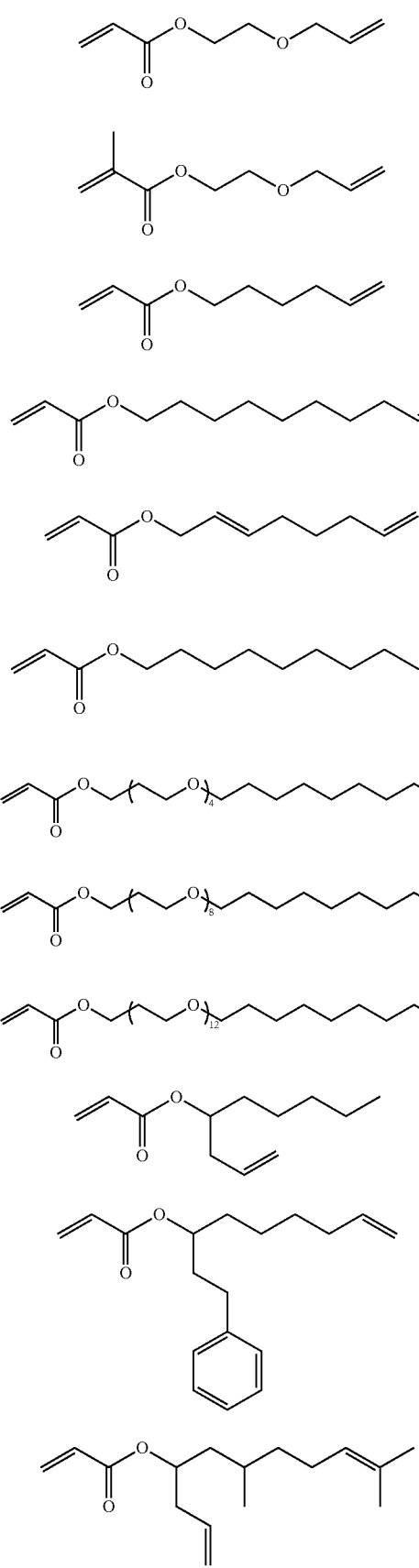
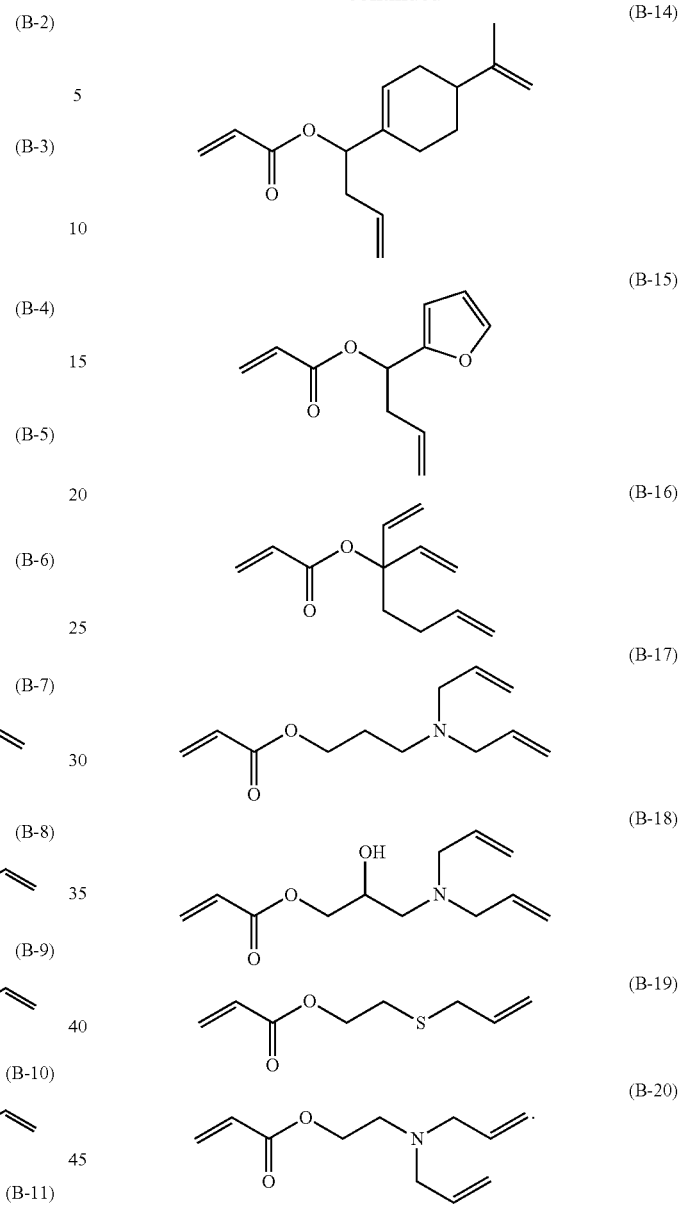

11. The ink composition of claim 1, further comprising a sensitizing dye.

12. The ink composition of claim 11, wherein the sensitizing dye comprises a polynuclear aromatic compound, thioxanthone, xanthene, cyanine, merocyanine, thiazine, acridine, anthraquinone, squalium, or coumarin.

13. The ink composition of claim 12, wherein the thioxanthone comprises isopropylthioxanthone.

14. An ink jet recording method comprising:
ejecting the ink composition of claim 1 onto a recording medium; and
irradiating the ejected ink composition with an active radiation ray to cure the ink composition.

15. A method for producing a planographic printing plate comprising:
ejecting the ink composition of claim 1 onto a hydrophilic support; and irradiating the ejected ink composition with an active radiation ray to cure the ink composition to faun a hydrophobic region of the cured ink composition on the hydrophilic support.

16. A planographic printing plate having a hydrophobic region obtained by curing the ink composition of claim 1 on a hydrophilic support.

* * * * *